(12) United States Patent
Masui et al.

(10) Patent No.: US 7,684,531 B2
(45) Date of Patent: Mar. 23, 2010

(54) DATA RECOVERY METHOD AND DATA RECOVERY CIRCUIT

(75) Inventors: Naruhiro Masui, Kanagawa (JP); Hidetoshi Ema, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1509 days.

(21) Appl. No.: 11/002,885

(22) Filed: Dec. 3, 2004

(65) Prior Publication Data
US 2005/0135527 A1    Jun. 23, 2005

(30) Foreign Application Priority Data
Dec. 5, 2003   (JP)   ............................. 2003-407613
Oct. 5, 2004   (JP)   ............................. 2004-292809

(51) Int. Cl.
*H04L 7/00*   (2006.01)
(52) U.S. Cl. ...................................... 375/355
(58) Field of Classification Search ................. 375/355, 375/362, 371–372; 327/2, 9, 141, 144, 152, 327/162–163
See application file for complete search history.

(56) References Cited

U.S. PATENT DOCUMENTS

| | | | | |
|---|---|---|---|---|
| 6,031,886 | A * | 2/2000 | Nah et al. | 375/375 |
| 6,130,577 | A * | 10/2000 | Tamba et al. | 329/304 |
| 6,266,799 | B1 * | 7/2001 | Lee et al. | 716/6 |
| 6,753,712 | B2 * | 6/2004 | Saeki | 327/165 |
| 7,054,374 | B1 * | 5/2006 | Jensen et al. | 375/257 |
| 7,113,560 | B1 * | 9/2006 | Huang et al. | 375/355 |
| 7,167,533 | B2 * | 1/2007 | Glenn et al. | 375/371 |
| 7,187,727 | B2 * | 3/2007 | Saeki | 375/327 |
| 2002/0114416 | A1 * | 8/2002 | Enam et al. | 375/373 |

FOREIGN PATENT DOCUMENTS

| | | |
|---|---|---|
| JP | 2002-190724 | 7/2002 |
| WO | WO 03/036853 A1 | 5/2003 |

OTHER PUBLICATIONS

B. Kim, et al., "A 30-Mhz Hybrid Analog/Digital Clock Recovery Circuit in 2-μm CMOS", IEEE Journal of Solid-State Circuits, vol. 25, No. 6, Dec. 1990, pp. 1385-1394.

* cited by examiner

*Primary Examiner*—Khanh C Tran
(74) *Attorney, Agent, or Firm*—Oblon, Spivak, McClelland, Maier & Neustadt, L.L.P.

(57) ABSTRACT

A data recovery method includes the steps of:
(a) oversampling data that have been transmitted serially in sync with a first clock of frequency f1, using a multiphase clock generated by shifting a phase of a second clock of frequency f2 at a prescribed interval, the second frequency f2 of the multiphase clock being at or below the first frequency f1;
(b) extracting f1/f2 bits on average from the oversampled data; and
(c) recovering the extracted bits to restore the received data.

9 Claims, 24 Drawing Sheets

| state | CKP[0:11] | Sel[0:11] | |
|---|---|---|---|
| St0 | 000111 000111 | 000100 000100 | |
| St1 | 001110 001110 | 001000 001000 | |
| St2 | 011100 011100 | 010000 010000 | |
| St3 | 111000 111000 | 100000 100000 | 000000 100000 (@St4→St3) |
| St4 | 110001 110001 | 000001 000001 | 100001 000001 (@St3→St4) |
| St5 | 100011 100011 | 000010 000010 | |

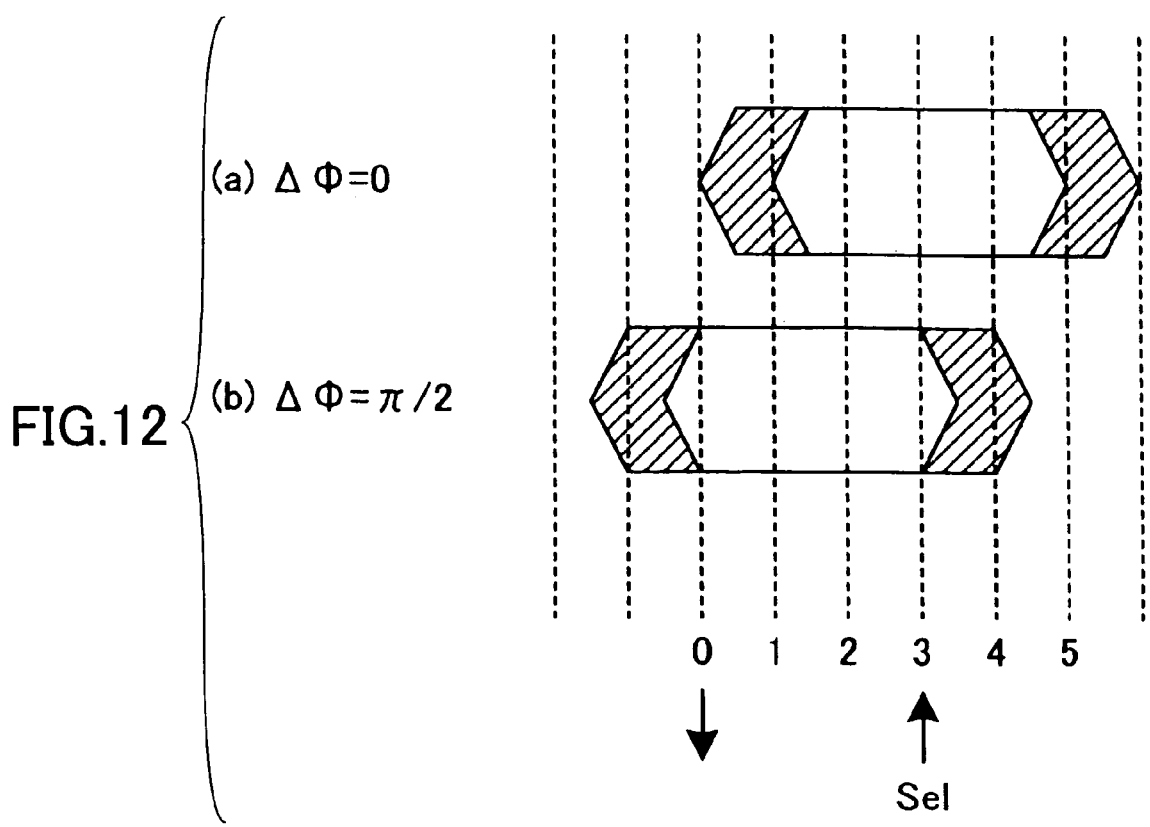

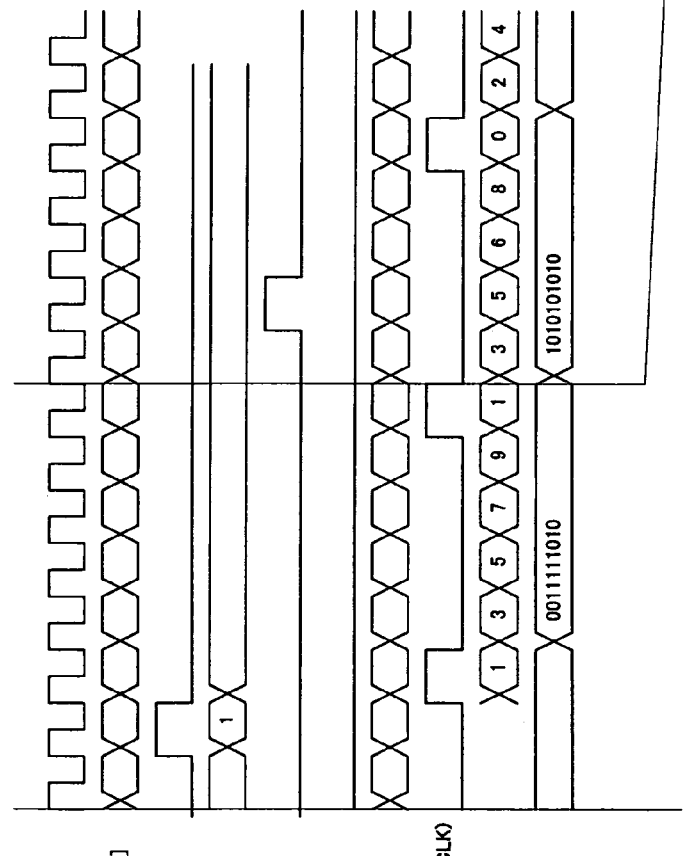
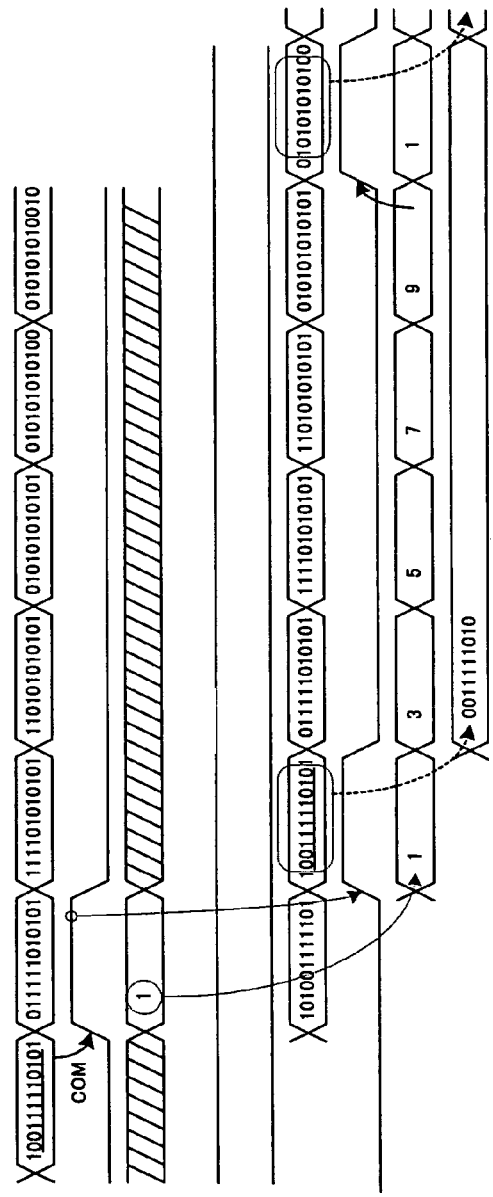
FIG.15A
FIG.15B

FIG.17A

OVSD

|  | 0 | ... | 11 |
|---|---|---|---|
| i | | | |
| 1 | 100000 | 011111 | |
| 2 | 100000 | 011111 | |
| 3 | 100000 | 000000 | |
| 4 | 011111 | 100000 | |
| 5 | 011111 | 111111 | |
| 6 | 100000 | 011111 | |
| ... | 110000 | 001111 | |
| | 110000 | 000000 | |
| n | 111000 | 000111 | |

FIG.17B

RxEdge

|  | 0 | ... | 11 |
|---|---|---|---|
| i | | | |
| 1 | 010000 | 010000 | |
| 2 | 010000 | 010000 | |
| 3 | 010000 | 000000 | |
| 4 | 010000 | 010000 | |
| 5 | 010000 | 000000 | |
| 6 | 010000 | 010000 | |
| | 001000 | 001000 | |
| | 001000 | 000000 | |
| n | 000100 | 000100 | |

FIG.17C

Sel 000010 000010

| i | RecData | Val |
|---|---|---|
| 1 | 0 1 | 2 |
| 2 | 0 1 | 2 |
| 3 | 0 0 | 2 |
| 4 | 1 0 | 2 |
| 5 | 1 1 | 2 |
| 6 | 0 1 | 2 |
| ... | 0 1 | 2 |
| | 0 0 | 2 |
| n | 1 0 | 2 |

DATA RECOVERY METHOD AND DATA RECOVERY CIRCUIT

BACKGROUND OF THE INVENTION

1. Field of the Invention

The present invention relates to a data recovery method and a data recovery circuit for restoring serially transmitted data.

2. Description of Related Art

In recent years and continuing, various types of high-speed interface standards have been proposed and put into practical use in order to respond to demand for high-speed data transmission. Examples of such interface standards include USB (Universal Serial Bus), Serial ATA (Advanced Technology Attachment), IEEE 1394, 1G/10G Ethernet (Registered trademark), InfiniBand, RapidIO, Fibre Channel, and PCI (Peripheral Component Interconnect bus) Express. It is expected that more and more emphasis will bw put on higher-rate and large-capacity data communication in the future.

Most of the high-speed interfaces employ serial transmission schemes for transmitting data according to a predetermined frequency. A clock of that frequency is embedded in the transmitted data. The receiving end extracts this clock from the received data, and restores the received data based on the extracted clock signal. The circuit for conducting the restoration process is called a clock data recovery (CDR) circuit.

In conventional CDR circuits, a phase locked loop (PLL) is generally used. The oscillation signal (or the clock) of the voltage controlled oscillator (VCO) of the PLL is controlled so as to be synchronized with the phase of the received data. The oscillation signal is output as a reproducing clock signal. The received signal is latched using the reproducing clock signal as the reference, and accordingly, restored accurately.

However, along with every year's increase of data transmission rate, the VCO frequency has reached the GHz order for data transmission. The CDR circuit incorporating such a high-frequency VCO has some negative effects, including increased chip size, increased power consumption, and increased cost. In addition, wiring-induced clock delay cannot be ignored in such a situation where further speed-up of data transmission is required, and sufficient consideration has to be given to wiring layout and device arrangement. As a result, the circuit design becomes more complicated. Since wiring delay greatly depends on the characteristics of the employed tools or devices, the wiring layout may have to be redesigned for each process, and in the worst case, the circuit itself may have to be redesigned. Thus, the reusability of the circuit is degraded, and the development period becomes long.

To overcome the above-described problem, an oversampling data recovery circuit is proposed. See B. Kim et al., "A 30-MHz Hybrid Analog/Digital Clock Recovery Circuit in 2-um CMOS" IEEE JSSC, December 1990, at 1385-1394.

FIG. 1 is a schematic block diagram illustrating the structure of a conventional clock data recovery (CDR) circuit. The conventional CDR circuit includes a multiphase clock generator 200, a flip flop circuit 201, and a digital PLL (DPLL) 202. The multiphase clock generator 200 is structured by a phase locked loop (PLL) or a delayed locked loop (DLL), and generates multiple clocks with the phases shifted from the reference clock (RefCLK) at regular intervals.

The flip flop (F/F) circuit 201 includes multiple flip flops, each of which receives input data at the data input terminal via a common path and receives a clock (one of clocks CLK1-CLKN) at the clock input terminal. Each flip flop takes the input data in at the rising edge (or the falling edge) of the corresponding clock. Accordingly, the data output from the flip flop circuit 201 are a set of data items sampled at the phase-shifted clocks. The digital PLL 202 detects the logic inversion timing from the bit sequence supplied from the flip flop circuit 201, selects a clock in sync with the inversion timing from the multiple clocks, and restores the selected clock as a recovery clock (Rec CLK). The DPLL 202 also selects and outputs data that have been sampled at a clock with the phase shifted (e.g., a clock in opposite phase) from the recovery clock (for example, a clock in opposite phase), as recovery data (RecData). The data inversion timing is detected after filtering (or smoothing by a filter) to select the recovery clock (RecCLK). This recovery clock (RecCLK) is used in the later-stage signal processor. With this arrangement, all the circuits, except for the multiphase generator 200, can be structured by digital circuits, and easily implemented.

However, the phase difference among the multiple clocks has to be controlled precisely because uneven phase difference may introduce errors.

FIG. 2 is a timing chart showing the problem caused by variation in phase difference in the conventional clock data recovery circuit. In this example, four clocks (CLK1-CLKN4) are generated with the phase shifted by prescribed degrees. It is assumed that the phase of CLK2 is behind from the ideal state by $\Delta$, that CLK2 is selected as the recovery clock (RecCLK), and that each data set is processed in sync with the recovery clock in the signal processor. If the phase of the recovery clock (RecCLK) is switched to that of CLK 1 at time Tsw, the period (T') of the recovery clock (RecCLK) becomes shorter by $\Delta$, other than the original phase difference. Consequently, time Tsu' required to set up the flip flop in the signal processor cannot be guaranteed, and in the worst case, errors occur. Even if the circuit is designed such that the clocks are generated at regular intervals at the output terminals of the multiphase clock generator 200, these clocks are influenced by skew (due to, for example, wiring or load) before the recovery clock (RecCLK) output terminal. The skew becomes conspicuous as the operating speed increases. In this case, variation in delay among multiple clocks has to be eliminated at each site; however, such elimination is very difficult and has not been realized yet.

Another publication JP 2002-190724A discloses a phase control technique for adjusting the clock phase using a phase interpolator at the multiphase clock generator. Using a phase interpolator enables multiple clocks to be output with the phase shifted at strict regular intervals. However, the circuit scale becomes large, and the wiring delay due to high-speed operation cannot be ignored. The wiring delay could be avoided by correcting the phases of the multiple clocks every input stage; however, this method is as difficult as implementing an oversampling CDR circuit that operates at oversampling frequency (which is four times the clock frequency of the transmitted data in the example shown in FIG. 2).

Thus, for those apparatuses using a conventional CDR circuit with an analog PLL or an oversampling CDR circuit to recover the clock from the input data to conduct signal processing based on the recovered clock, the development period becomes longer and longer as the transmission rate increases because CDR design becomes more difficult.

SUMMARY OF THE INVENTION

The present invention is conceived in view of the above-described problems, and it is an object of the present invention to provide a data recovery technique for accurately restoring data using an independent clock at or below clock frequency of the input data, instead of recovering clocks contained in the input data, under less influence of jitter even if jitter is contained in the input data.

To achieve the object, in one aspect of the invention, a data recovery method is provided. The method includes the steps of:

(a) oversampling data that have been transmitted serially in sync with a first clock of frequency f1, using a multiphase clock generated by shifting a phase of a second clock of frequency f2 at a prescribed interval, the second frequency f2 of the multiphase clock being at or below the first frequency f1;

(b) extracting f1/f2 bits on average from the oversampled data; and (c) recovering the extracted bits to restore the received data.

In another aspect of the invention, a data recovery circuit for restoring data by oversampling serially transmitted data is provided. The data recovery circuit comprises:

(a) a sampling unit configured to oversample data that have been transmitted serially in sync with a first clock of frequency f1, using a multiphase clock generated by shifting a phase of a second clock of frequency f2 at a prescribed interval, the second frequency f2 of the multiphase clock being at or below the first frequency f1;

(b) a data restoration unit configured to extract f1/f2 bits on average from the oversampled data and recover the extracted bits to restore the received data.

In this manner, the serially transmitted data sequence is oversampled using a multiphase clock of frequency f2, which frequency is at or below clock frequency f1 contained in the serially transmitted data, without directly using the data transmission clock f1. A prescribed number of bits are extracted from the oversampled data, taking the phase deviation due to frequency difference into account. Consequently, the data recovery process can be carried out easily even at a high transmission rate, while preventing adverse effect of jitter, and accurate data recovery is realized.

With the data recovery method and circuit, a separate clock independent of the data transmission clock is used to oversample the received data. In addition, the received data are recovered using the clock pattern with the same period as that of the transmission clock contained in the received data, while shifting the phase of the clock pattern. Consequently, there is little influence of frequency difference and/or jitter on the recovered data. Because the frequency f2 of the multiphase clock can be set to a fraction of clock f1 of the received data, the circuit can easily respond to a rise in data transmission rate.

BRIEF DESCRIPTION OF THE DRAWINGS

Other objects, features, and advantages of the present invention will become more apparent from the following detailed description when read in conjunction with the accompanying drawings, in which:

FIG. 12 is a diagram for explaining the relation between phase error and jitter tolerance;

FIG. 15A is a timing chart illustrating various signals used in the symbol synchronization controller and the symbol converter shown in FIG. 13, and FIG. 15B is an enlarged view of a part of the timing chart of FIG. 15A;

FIG. 17A through FIG. 17E illustrate examples of various data items generated from the oversampled data;

DETAILED DESCRIPTION OF THE PREFERRED EMBODIMENT

The preferred embodiments of the present invention are now explained below in conjunction with attached drawings.

First Embodiment

Figure 1:
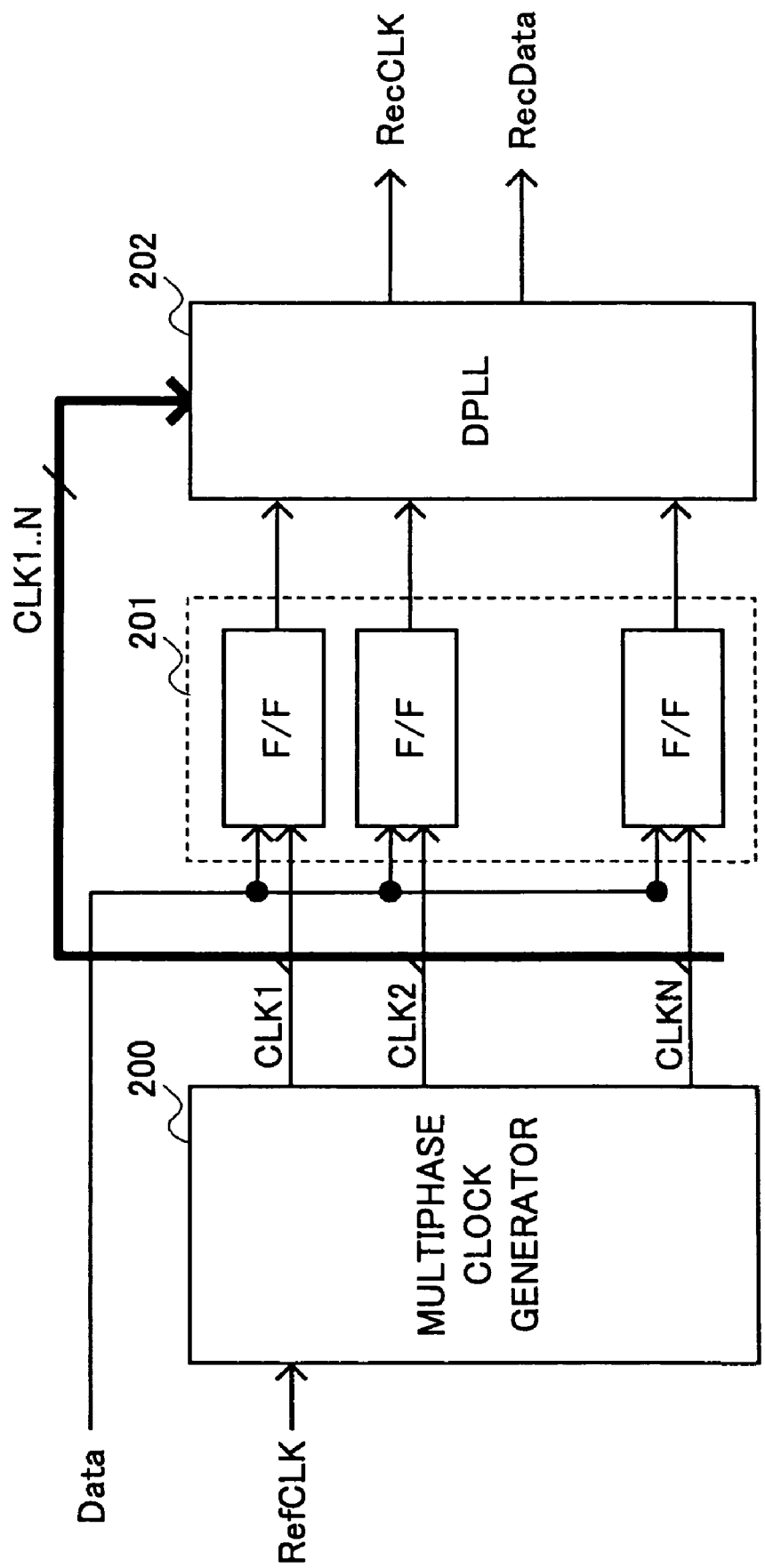
FIG. 1 is a block diagram illustrating the structure of a conventional clock data recovery (CDR) circuit.
Figure 2:
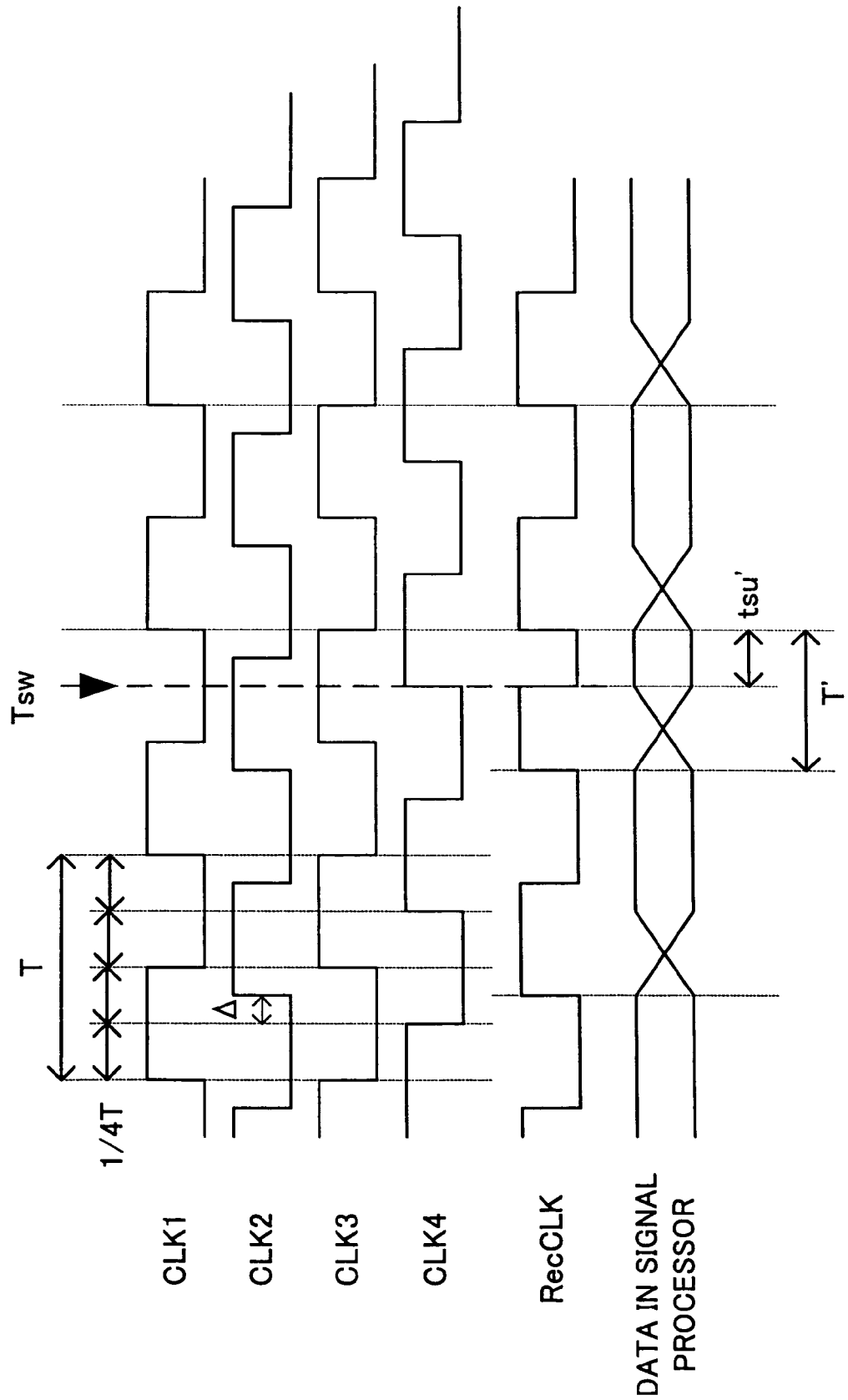
FIG. 2 is a timing chart showing a problem in the conventional CDR circuit due to deviation in phase shifted clocks.
Figure 3:
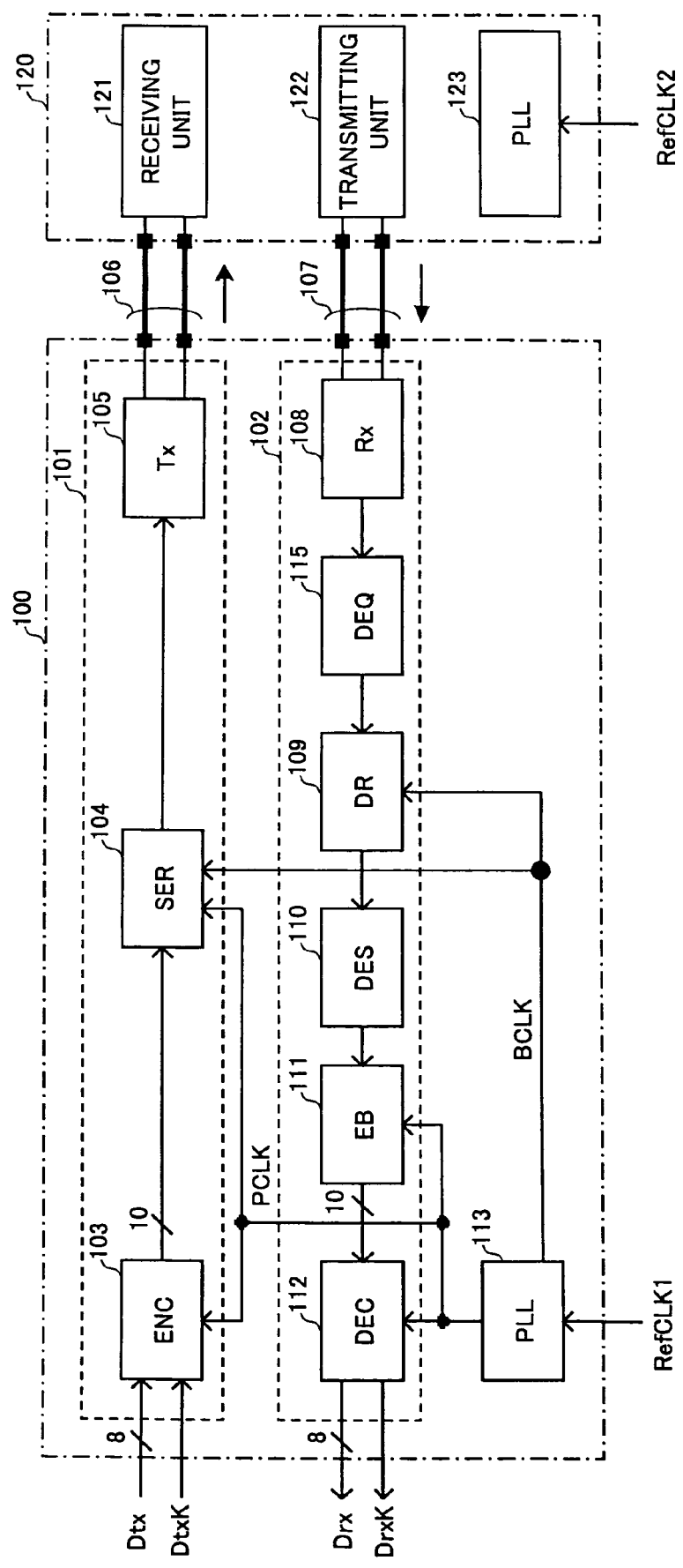
FIG. 3 is a schematic diagram illustrating the structure of the physical layer of serial data transmission to which the data recovery circuit of the present invention is applied.

FIG. 3 is a schematic block diagram illustrating serial data transmission to which a data recovery circuit is applied according to the first embodiment of the invention.

The physical layer 100 includes a transmitter 101 for transmitting data and a receiver 102 for receiving data. Data are transmitted and received to and from another physical layer 120 having a pair of transmitter 122 and receiver 121, via transmission lines 106 and 107. The physical layer 100 has a PLL 113 for generating a clock of frequency f2 from a reference clock RefCLK 1. The physical layer 120 has a PLL 123 for generating a clock of frequency f1 from a reference clock RefCLK 2. The physical layers 100 and 120 operate at frequencies f2 and f1 produced by the PLLs 113 and 123, respectively. The pair of transmitter 101 and receiver 102, and the pair of transmitter 121 and receiver 122 are called ports. Serial data transmission is performed between the ports by point-to-point.

The transmission lines 106 and 107 of the present embodiment form a full duplex line enabling transmission and receiving of data simultaneously through separate transmission lines; however, the invention is not limited to this example and half (or partial) duplex may be employed. In place of the transmission lines 106 and 107, wireless transmission channels may also be employed.

The transmitter 101 includes an encoder 103 for encoding transmission data Dtx supplied from an upper layer according to a prescribed conversion rule, a serializer 104 for converting the coded data to serial data, and an output unit 105 for outputting the serially converted data to the transmission line 106. The data are transmitted through the transmission line 106 using differential signals. The encoder 103 encodes the input data by 8b/10b coding for converting 8-bit data to 10-bit data (named "symbol data"). By the 8b/10b conversion, a 10-bit special K-character set is generated using a one-bit control bit (DtxK), other than actual data. Since the 8b/10b conversion is known, detailed explanation is omitted in this embodiment.

The PLL 113 generates a data transmission clock BCLK at a frequency defined by the associated protocol, as well as an internal clock PCLK, obtained by dividing the transmission clock BCLK by 10, for the internal operations, based on the externally supplied reference clock RefCLK1. For example, if the data transmission rate is 1.5 Gbps, the transmission clock BCLK is generated at 2.5 GHz, and the internal clock PCLK is generated at 250 MHz. The internal clock PCLK is supplied to the encoder 103, while transmission clock BCLK and internal clock PCL are supplied to the serializer 104, to drive each component. Data transmission and receipt to and from the upper layer are also carried out in sync with the internal clock PCLK.

The receiving unit 102 includes a receiving end input unit (Rx) 108 for binarizing the differential signals having been transmitted through the transmission line 107, a data recovery unit (DR) 109 for restoring the binarized data, a deserializer (DES) 110 for converting the restored data to 10-bit parallel symbol data, an elastic buffer (BE) 111 for absorbing the frequency difference between the transmission side clock and the receiving side clock, and a decoder (DEC) 112 for converting the 10-bit symbol data to 8-bit data (10b/8b conversion).

The counterpart physical layer 120 also includes a transmission unit 122, which transmits data in sync with a transmission clock of frequency f1 produced by the PLL 123 from the externally supplied reference clock RefCLK2.

The elastic buffer 111 absorbs frequency difference by adding or deleting special codes. Although, in the example shown in FIG. 3, the elastic buffer 111 is positioned before the decoder 112, it may be arranged after the decoder 112. The acceptable range of the frequency difference is defined by the associated interface standard.

The data recovery circuit of the first embodiment is applied to the data recovery unit 109 of the receiving unit 102. In this example, the data recovery circuit also functions as the deserializer 110; however, the invention is not limited to this example. The structure and the function of the other components of the physical layer 100 may be arbitrarily modified as long as they are combined with the data recovery circuit of the first embodiment.

In the physical layer 100 of the first embodiment, multiphase clocks supplied to the data recovery unit 109 and internal clocks PCLK supplied to the elastic buffer 111 are generated by the PLL 113. These clocks are also supplied to the transmission unit 101 (for supplying the internal clock PCLK and the transmission clock BCLK to the serializer 104 and the encoder 103). Thus, the PLL 113 is used in common for clock generation in the transmission unit 101 and the receiving unit 102. This is realized by generating clocks from a separate reference clock RefCLK1, independent of the reference clock RefCLK2 of the counterpart port, to drive all the components of the physical layer 100.

Figure 4:
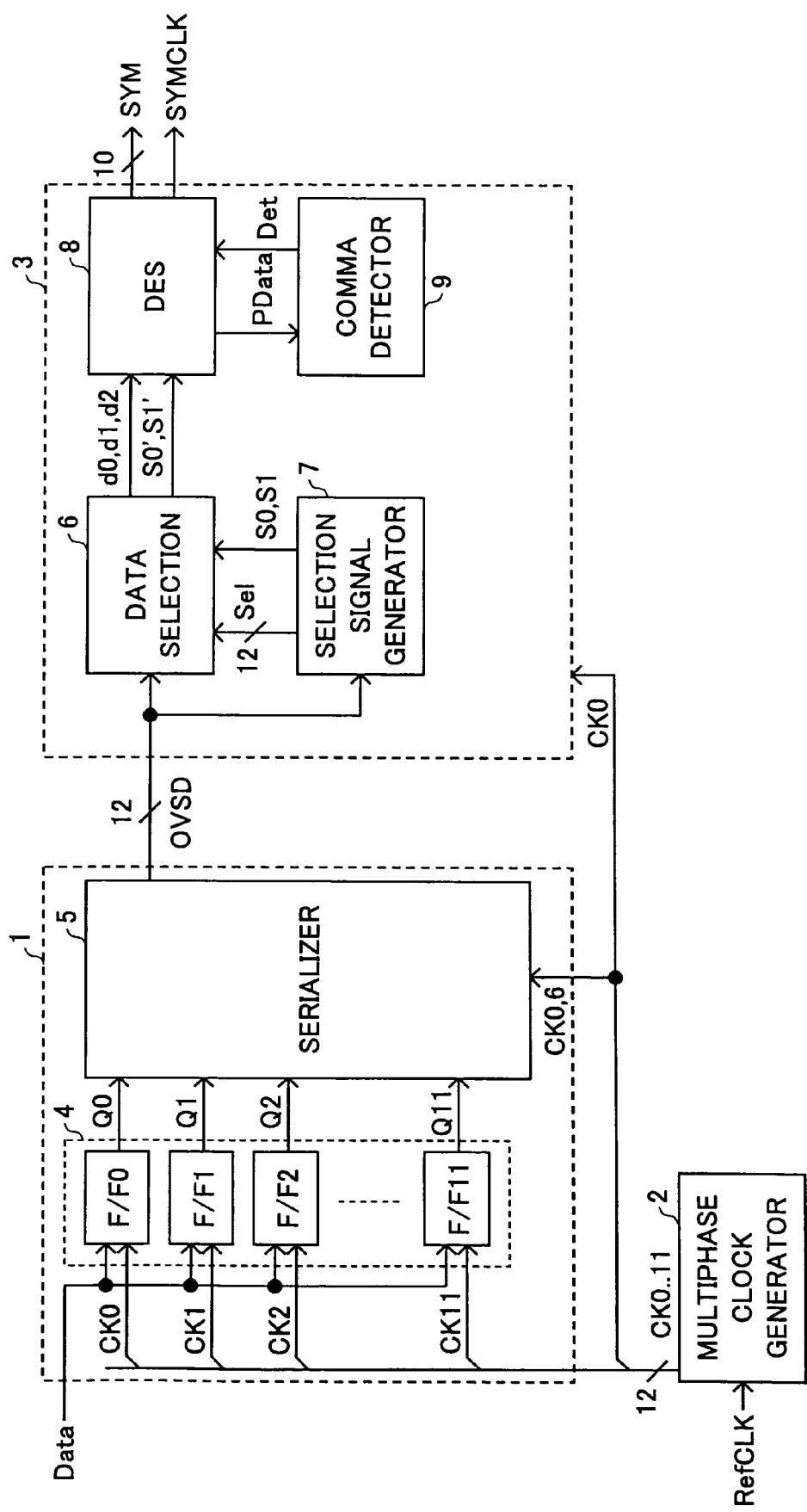
FIG. 4 is a block diagram of a data recovery circuit according to the first embodiment of the invention.

FIG. 4 is a block diagram of the data recovery circuit according to the first embodiment of the invention. The data recovery circuit includes an oversampling unit 1, a multiphase clock generator 2, and a symbol data restoration unit 3.

In this example, the data recovery unit 109 shown in FIG. 3 is structured by a part of the oversampling unit 1 and a part of the symbol data restoration unit 3, and the deserializer 110 shown in FIG. 3 is structured by the other part of the symbol restoration unit 3. The PLL 113 shown in FIG. 3 is structured by the multiphase clock generator 2.

The deserializer 110 corresponds to a serial to parallel converter. The serial to parallel converter does not necessarily have to be included in the data recovery circuit, and it may be provided separately.

The oversampling unit 1 takes received data in sync with multiphase clocks CK0-CK11 supplied from the multiphase clock generator 2, and outputs oversampled data OVSD.

The symbol data restoration unit 3 restores 10-bit symbol data SYM from the oversampled data OVSD to generate symbol clock SYMCLK. Thus, the symbol data restoration unit 3 has a data recovery function and a deserializing function. The symbol data restoration unit 3 operates in sync with one of the multiphase clocks (CK0 in the example shown in FIG. 4).

The multiphase clock generator 2 generates a clock of a prescribed frequency from the reference clock RefCLK, and shifts the phase of the generated clock at regular intervals to produce multiphase clocks. In this embodiment, the multiphase clock generator 2 generates multiple phase-shifted clocks CK0-CK11, each of which has a frequency f2 that is half of the transmission clock BCLK with a predetermined period U1. In this case the phase difference among the multiphase clocks is one sixth (⅙) of period U1. In other words, if the data transmission rate is 2.5 Gbps (where U1 is 400 ps), then twelve clocks are generated at a phase difference of 66.7 ps, each clock having a period of 800 ps and a clock frequency of 1.25 GHz.

The frequency f2 of the multiphase clock is not necessarily half of the transmission clock, and it may be set to a quarter (¼) of the transmission clock. In this case, 24 multiphase clocks are generated. Similarly, the phase difference among the multiphase clocks is not limited to ⅙ of U1. In addition, the multiphase clock generator 1 may be provided separately from the data recovery circuit although in this example it is included in the data recovery circuit.

By using multiphase clocks, each clock having a frequency f2 lower than the transmission clock frequency f1, in the data recovery circuit, the oscillation frequency of the multiphase clock generator 2 can be reduced, and therefore, it can deal with increased transmission rate.

Next, explanation is made of each component. The oversampling unit 1 includes a set of twelve flip flops (F/F0 through F/F11) 4 and a serializer 5 for outputting the input data in sync with one of the clocks (e.g., with clock CK0). The received data are connected in common to the input terminal of each of the twelve flip flops 4, and taken in the associated flip flop 4 at the rising edge of one of the multiphase clocks CK0-CK11. The outputs of the flip flop set 4 are Q0 through Q11.

The serializer 5 has, for example, two flip flops for latching the output group Q0-Q5 and the output group Q6-Q11, respectively. Then, the two groups of sampled data items are combined together, and a set of outputs Q0-Q11 is output as the oversampled data OVSD in sync with one of the multiphase clocks (e.g., with CK0).

Figure 5:
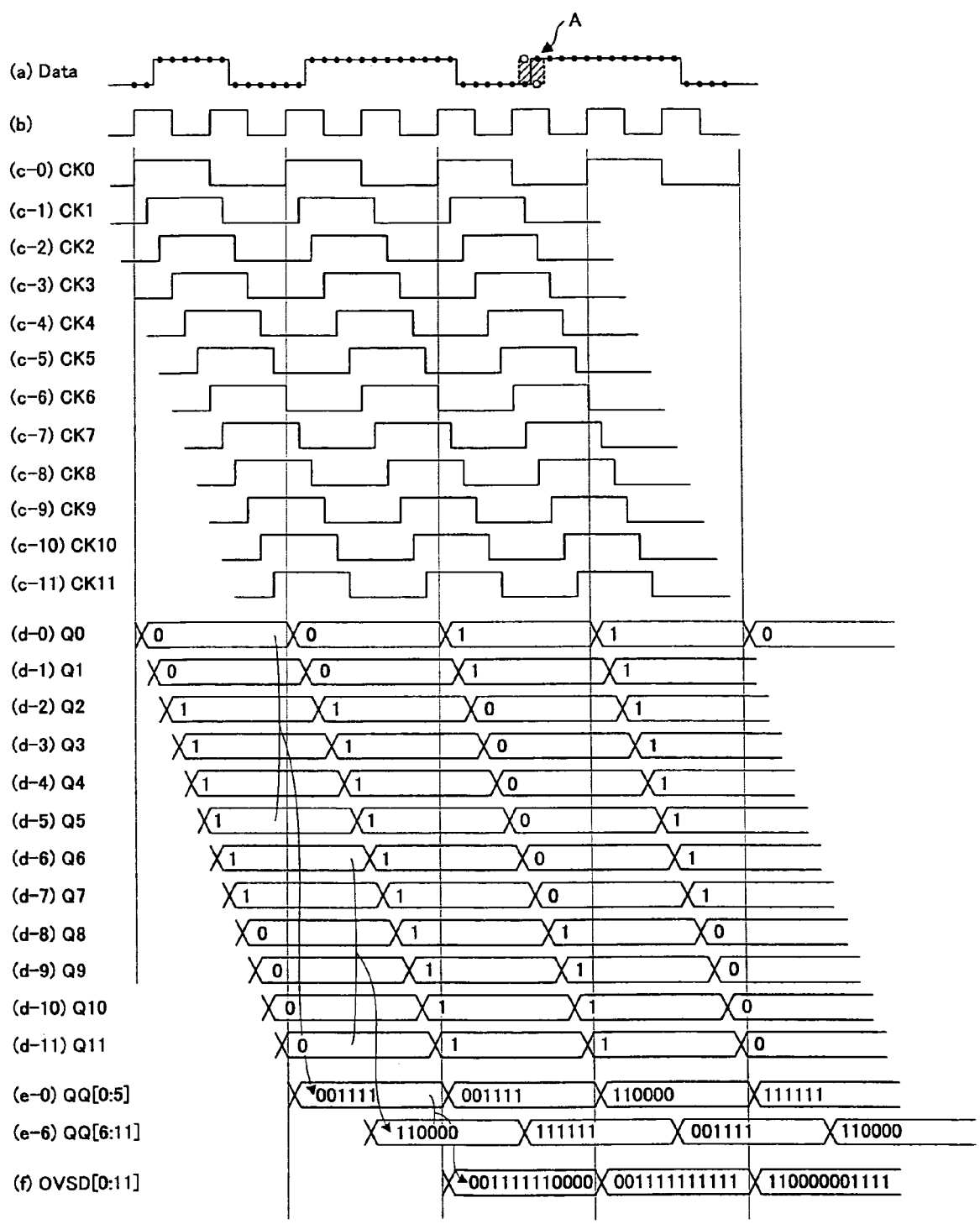
FIG. 5 is a timing chart showing an example of waveforms of the major signals in the oversampling unit.

FIG. 5 is a timing chart illustrating an example of waveforms of the major signals used in the oversampling unit 1. Waveform (a) represents the received data, waveform (b) represents the data transmission clock (which does not actually exist in the oversampling unit 1, but is illustrated for better explanation), waveforms (c-0) through (c-11) represent the multiphase clocks CK0-CK11, waveforms (d-0) through (d-11) represent data Q0-Q11 taken in the associated flip flops 4 at timing of multiphase clocks and output from the flip flops 4, a pair of waveforms (e-0) and (e-6) represent two data groups Q0-Q5 and Q6-Q11, respectively, taken in the serializer 5, and waveform (f) represents the oversampled data OVSD output from the serializer 5.

The period of each of the multiphase clocks CK0-CK11 is set to be double that of the clock period U1 (2*U1) of the data transmission clock (indicated by (b)), and the phases of the multiphase clocks shift at regular intervals. The dots aligning on the waveform (a) of the received data indicate the sampling points at which the data are taken in the flip flops 4 at the timings of the multiphase clocks. The outputs Q0-Q11 of the flip flops 4 change as illustrated by (d-0) through (d-11).

The first group of data Q0-Q5 is taken in the serializer 5 at clock CK0, which is denoted as QQ[0:5] labeled (e-0). The second group of data Q6-Q11 is taken in the serializer 5 at clock CK6, which is denoted as QQ[6:11] labelled (e-6). At next clocks CK0, QQ[0:5] and QQ[6:11] are combined or serialized, and output as oversampled data OVSD [0:11] as indicated by waveform (f). In FIG. 5, the left-hand side of the bit sequence denotes the LSB, representing the earlier sampling point in time.

This arrangement is advantageous because if all the outputs Q0-Q11 are taken at once, setup time will run out for the last few bits (for example, for Q10 and Q11), and consequently the correct data cannot be acquired. To overcome this problem, the data are taken in the serializer in two steps to guarantee stable data acquisition. The number of steps for taking the data in may be further increased in order to achieve reliable data acquisition.

In general, the rising edge or the falling edge of the received data fluctuates randomly or due to various factors, as illustrated by the hatched portion A. This phenomenon is known as jitter. Especially, the sampling data fluctuates at or near the data transmission timing illustrated by white dots, and accurate data restoration may be prevented. In contrast, the multistep data acquisition employed in the embodiment can reduce jitter, and enables accurate data restoration.

The symbol data restoration unit 3 includes a data selection unit 6, a selection signal generator 7, a deserializer 8, and a comma detector 9. The symbol data restoration unit 3 restores 10-bit symbol data SYM from the oversampled data OVSD through serial to parallel conversion, and outputs a phase-shifted symbol clock SYMCLK.

The oversampled data OVSD are 12-bit data obtained by sampling two bits of the transmission data using 6-phase clock signals. From the 12-bit oversampled data OVSD, each bit pair sampled in a prescribed phase is selected and output.

If the frequency of the transmission clock contained in the data transmitted from the transmission unit 122 of the physical layer 120 is the same as or a natural number fraction of the frequency of the multiphase sampling clock (each of CK0-CK11) used in the receiving unit 102 of the physical layer 100, the sampling phase may be fixed. However, there is typically a certain range of frequency difference, and therefore, the sampling phase is adjusted slightly. For example, a 2-bit data item (that is, the number of recovered bits is two) is output ordinarily, and a 1-bit data item and a 3-bit data item are output selectively at certain timings.

If 1000 ppm (0.1%) frequency difference exists, the received data sequence is offset by one bit every 1000 bits of the transmission data. Therefore, a 1-bit data item or a 3-bit data item is output every 500 cycles of oversampling clock CK0.

The selection signal generator 7 generates a selection signal (Sel) that indicates the data acquisition phase (or bit position to be taken in) in the oversampled data OVSD, as well as state signals S0 and S1 for indicating the number of bits (1, 2, or 3) to be recovered. If S0 is "1" and S1 is "0", the number of bits to be selected is 1. If S1 is "1" and S0 is "0", the number of bits is 3. If both S0 and S1 are "1", the number of bits is 2. It is designed such that the situation where both S0 and S1 become "1" does not occur.

The data selection unit 6 selectively outputs a 1-bit data item, a 2-bit data item, or 3-bit data item (d0, d1, or d2) from the oversampled data OVSD, based on the selection signal Sel and the state signals S0 and S1. In addition, the data selection unit 6 outputs state signals S0' and S1' delayed behind S0 and S1 by a prescribed time.

The comma detector 9 detects a comma (a special code named a "comma") inserted in the transmission data at a prescribed interval, and outputs a comma detection signal Det.

Deserializer 8 converts serially input data items d0-d2 supplied from the data selection unit 6 into parallel 10-bit symbol data SYM (serial to parallel conversion). The deserializer 8 also outputs a symbol clock SYMCLK.

Figure 6:
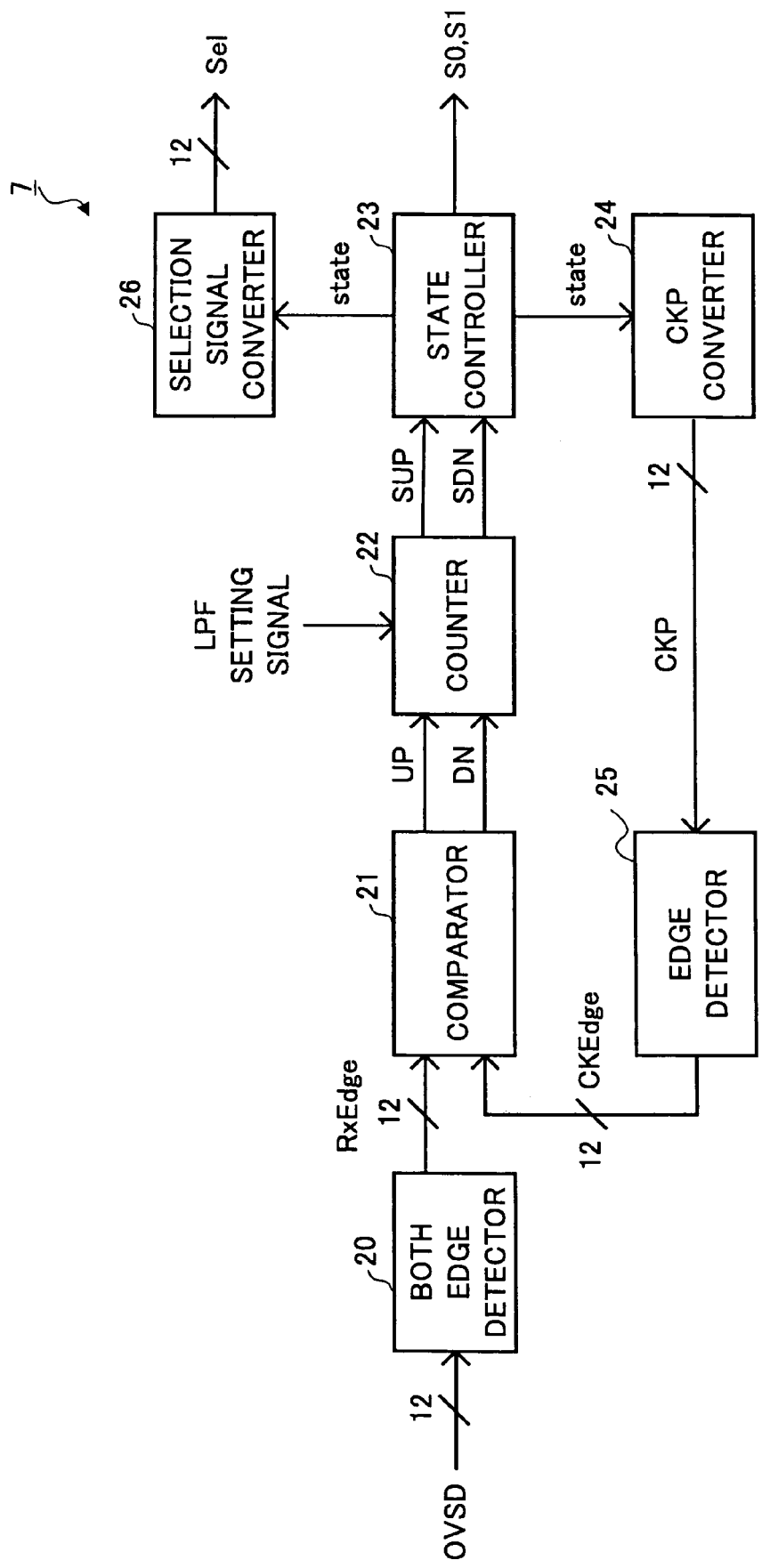
FIG. 6 is a block diagram of the selection signal generator.

FIG. 6 is a block diagram of the selection signal generator 7 shown in FIG. 4, FIG. 7A is a timing chart showing the waveforms of the major signals of the selection signal generator 7, and FIG. 7B is an enlarged view of a part of signal waveforms. The signals labeled (a) through (h-2) in FIG. 7A correspond to those signals indicated by the same names in FIG. 6. In FIG. 7B, signals labeled (b) through (g-2) are illustrated in an enlarged view. The bit sequence illustrated in FIG. 7A and FIG. 7B represents the LSB to the MSB from the left to the right. The LSB is the bit received the earliest.

Waveform (a) represents clock CK0 supplied from the multiphase clock generator 2, waveform (b) represents oversampled data OVSD [0:11], waveform (c) represents the both-edge signal RxEdge of the oversampled data OVSD, waveform (d) represents the transition state introduced when shifting the phase of the clock pattern according to the transmission data, waveform (e) represents a clock pattern CKP consisting of a sequence of 12 bits generated by oversampling clock CK0, and waveform (f) represents the falling edge CKEdge [0:11] of the clock pattern CKP. Waveforms (g-1) and (g-2) represent phase shift indicators (UP and DN) indicating the phase shift timing of the clock pattern, which are described with reference to FIG. 8 below. Waveforms (h-1)

and (h-2) represent timings at which the number of the phase shift indicators (UP and DN) exceeds a prescribed number (N).

Returning to FIG. 6, the selection signal generator 7 includes a both edge detector 20, a comparator 21, a counter 22, a state controller 23, a clock pattern (CKP) converter 24, an edge detector 25, and a selection signal converter 26. The selection signal generator 7 operates based on the clock CK0 (which is illustrated as waveform (a) in FIG. 7) supplied from the multiphase clock generator 2.

The both edge detector 20 detects the rising edge and the falling edge of the bit sequence of the oversampled data OVSD (depicted by waveform (b)), and generates a both-edge signal RxEdge (illustrated as waveform (c)) for indicating the edge position.

Figure 7:
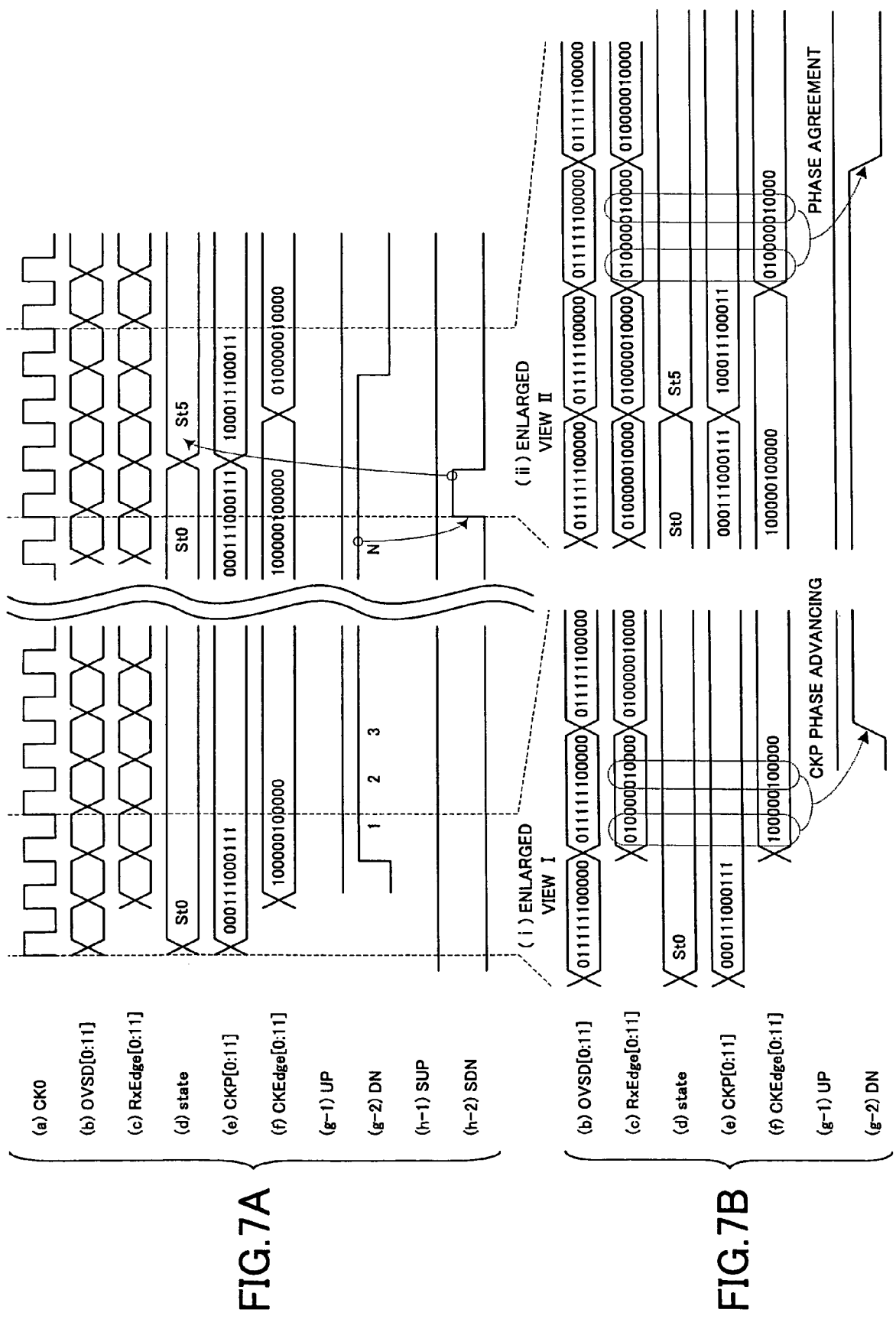
FIG. 7A is a timing chart showing the waveforms of the major signals in the selection signal generator.
FIG. 7B is an enlarged view of a part of the timing chart of FIG. 7A.

The RxEdge signal is the EXOR result (exclusive logical sum) of the oversampled data OVSD [0:11] and one-phase delayed data dOVSD [0:11] delayed by one bit from OVSD. The delayed data dOVSD [0:11] is expressed as dOVSD[0:11]={pOVSD[11],OVSD[0:10]} where pOVSD [11] is one-clock previous data of OVSD [11]. For example, as illustrated in FIG. 7, if OVSD [0:11] is "011111100000", then dOVSD [0:11] becomes "001111110000", and RxEdge [0:11] becomes "010000010000".

The comparator 21 compares the both-edge signal RxEdge (waveform (c)) and the falling edge signal CKEdge of clock CL0 to determine which phase is advancing. If the phase of CKEdge is ahead, then DN signal (g-2) is set to "H". If the CKEdge is behind the edge signal RxEdge, then UP signal (G-1) is set to "H". If the phases of RxEdge and CKEdge agree with each other, DN and UP signals are set to "L".

The counter 22 counts output UP signals and DN signals. If the number of UP signals or the number of DN signals reaches a prescribed value N defined by the LPF setting signal, a SUP signal (h-1) or a SDN signal (h-2) is output. The counter 22 counts the UP signal or the DN signal, functioning as the loop filter of a phase locked loop (PLL).

The counter 22 is, for example, a digital up-down counter. If UP signal is "H", the counter value is incremented by 1, and if DN signal is "H", the counter value is decremented by 1. If the counter value exceeds the prescribed positive value (for example, positive N), the SUP signal is set to "H" and the counter value is reset to the initial value (zero, for example). If the counter value reaches below the prescribed negative value (for example, negative N), the SDN signal is set to "H", and the counter is initialized.

The positive and negative threshold values may be changed using the LPF setting signal to vary the averaging range. By averaging the phase-shift comparison result at the counter, whether the average position of data transition timing of the oversampled data OVSD is ahead or behind the clock can be detected even if the data transition timing of the oversampled data OVSD fluctuates due to jitter in the received data.

The positive and negative threshold values are selected taking into account the response characteristic to the frequency difference between the receiving end and the transmission end. For example, if the frequency difference is 1000 ppm, six SUP signals (or six SDN signals) are adequate to be output among 500 clocks CK0, and N may be set to a suitable value (16 or 32, for example) less than 83 and for achieving the averaging effect.

To simplify the structure, if phase advancing or phase delay is detected for multiple edges in comparator 21, both UP signal and DN signal are set to "H". In this case, the counter 22 does not count up or down if both UP signal and DN signal are "H".

The state controller 23 controls six phase states (st0-st5) of the clock pattern CKP. The clock pattern CKP in this example is a 12-bit clock pattern oversampled from the transmission clock at twelve phases of clock signals, each clock having a frequency equivalent to the transmission clock and one twelfth of the period.

Figures 8, 9:
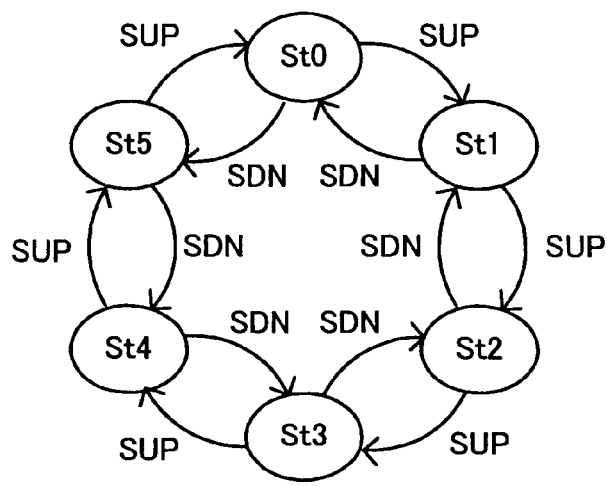
FIG. 8 is a schematic diagram showing the phase transition of the clock pattern CKP.
FIG. 9 is a table showing an example of conversion rule for converting the state signal to a clock pattern CKP.

FIG. 8 is a schematic diagram illustrating the phase transition of the clock pattern CKP. The transition condition of the clock pattern CKP is that the phase state shifts one by one clockwise among six states St0-St5 every time an "H" level SUP signal is output from the counter 22, and counterclockwise every time an "H" level SDN signal is output from the counter 22). The initial state is, for example, St0, and the state controller 23 outputs the state signal indicating the initial state St0, together with the state signals S0 and S1. The state signal S0 becomes "H" when the phase state transmits from St4 to St3, and State signal s1 becomes "H" when the phase sate transits from St3 to St4.

Returning to FIG. 6, the CKP converter 24 converts the state signal to the clock pattern CKP.

FIG. 9 is a table illustrating an example of a conversion rule for converting the state signal to the clock pattern CKP. The clock pattern shown in FIG. 9 is a 12-bit pattern oversampled at twelve phases determined by dividing the period (IU1) of the transmission clock, and as the phase of the clock pattern CKP advances by one bit as the phase state transits to the next state in states St0-St5.

The selection signal converter 26 converts the state signal to the selection signal Sel. The selection signal Sel becomes "1" at the rising edge of the clock pattern CKP. This conversion rule is also illustrated in FIG. 9, together with the clock pattern (CKP) conversion rule.

When the phase state transitions from St4 to St3, or from St3 to St4, a different selection signal illustrated in the right-hand side of the table is output. The state signals S0 and S1 represent the number of bits to be selected or recovered, that is, the number of bits "1" in the selection signal or the number of rising edges of a clock. If S0 is "1", the number of bits "1" contained in the selection signal Sel is one. In this case, a 1-bit data item is to be output. If S1 is "1", the number of bits "1" in the selection signal Sel is three. In this case, a 3-bit data item is to be output. If S0 and S1 are "0", the number of bits "1" is two, which is the ordinary case. As illustrate in FIG. 9, when the phase state shifts from St4 to St3, only one bit is "1" in the selection signal Sel. When the phase state shifts from St3 to St4, three bits in the selection signal Sel become "1". These patterns are different from the ordinary selection signals containing two effective bits "1".

The edge detector 25 detects a bit position at which the logic of the bit sequence of the clock pattern CKP is inverted with a bit changing from "1" to "0", that is, the position of the falling edge of the clock pattern CKP, and outputs a falling edge signal CKEdge. The falling edge signal CKEdge is output by performing a logical operation (~CKP&dCKP) on the clock pattern signal CKP and one-phase delayed data dCKP [0:11] delayed by one bit from the clock pattern CKP bit by bit.

The symbol "~CKP" represents a NOT operation, and "&" represent an AND operation. If a one clock previous CKP [11] is denoted as pCKP11, then dCKP [0:11] is expressed as dCKP[0:11]={pCKP11,CKP[0:10]} as has already been described above.

Returning again to FIG. 7, the oversampled data OVSD (waveform (b)) is data oversampled from the transmission data "10101010 . . . " at the oversampling unit 1, and consists of successive data sequences of "011111100000". The state signal depicted as waveform (d) begins with St0. Based on the state signal St0, the clock pattern CKP (waveform (d)) of "000111000111" is output according to the conversion rule shown in FIG. 9. The edge signal RxEdge (waveform (c)) becomes "010000010000", and the falling edge DKEdge of the clock pattern CKP (waveform (f)) becomes "100000100000".

In the period (i) shown in the enlarged view I of FIG. 7B, the rising position of the clock pattern CKP is ahead of the edge position RxEdge of the oversampled data OVSD. Consequently, the DN signal labeled (g-2) become "H". When the counter value of the counter 22 reaches −N, the SDN signal labeled (h-2) become "H", and the transition state changes to St5, as indicated by waveform (d). As a result, the clock pattern CKP (waveform (e)) changes to "100011100011", and the phases of RxEdge (waveform (c)) and CKEdge (waveform (f)) come into agreement, as illustrated in the enlarged view II of FIG. 7B. In this manner, the clock pattern CKP is synchronized with the oversampled data OVSD.

Figure 10:
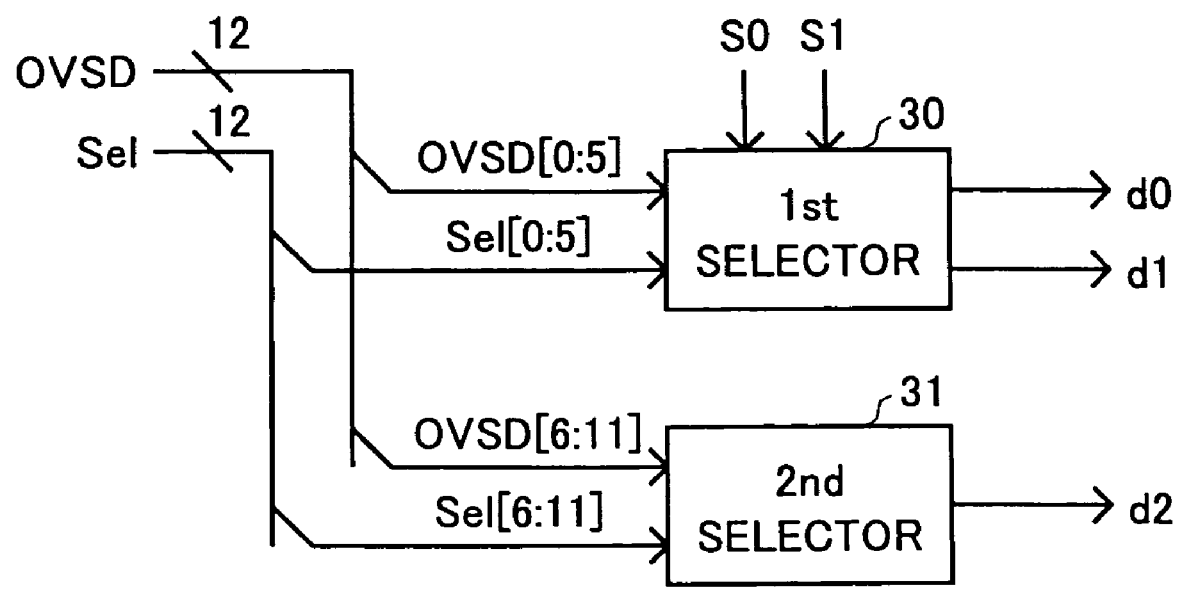
FIG. 10 is a block diagram illustrating an example of the data selector.

FIG. 10 is a schematic block diagram of the data selector 6. The data selector 6 has a first selector 30 and a second selector 31. The first selector 30 restores data items d0 and d1 from the oversampled data OVSD [0:5] based on the selection signal Sel [0:5] and the state signals S0 and S1. The second selector 31 restores a data item d2 from the oversampled data OVSD [6:11] based on the selection signal Sel [6:11] output from the selection signal generator 7.

The data items d0, d1, and d2 are converted according to the following rules, where the symbol "&" represents the logical product or AND operation.

If S0 is "H", ignore d0 and d1;

If S1 is "H", convert d0 to OVSD[0], and convert d1 to OVSD[5];

If S0 and S1 are "L", convert d0 to logical product OVSD [k]&Sel[k] with k varied from 0 to 5, and ignore d1; and Convert d2 to logical product OVSD[k]&Sel[k] with k varing from 6 to 11, regardless of S0 level and S1 level ("H" or "L").

If S0 is "H", only d2 becomes effective data. If S1 is "H", three data items d0, d1, and d2 are effective. If both S0 and S1 are "L", two data items d0 and d1 become effective.

When outputting these effective data items, state signals S0' and S1' delayed from S0 and S1 by the operation delay time of the selector are output to indicate the effective states of the restored data d0, d1 and d2.

Next, explanation is made of the synchronization between the clock pattern CKP and the oversampled data OVSD carried out when the clock frequency f1 of the received data does not agree with the clock frequency f2 (which is the both edge evaluation of multiphase clocks CK0-CK11) of the receiving end.

Figure 11A:
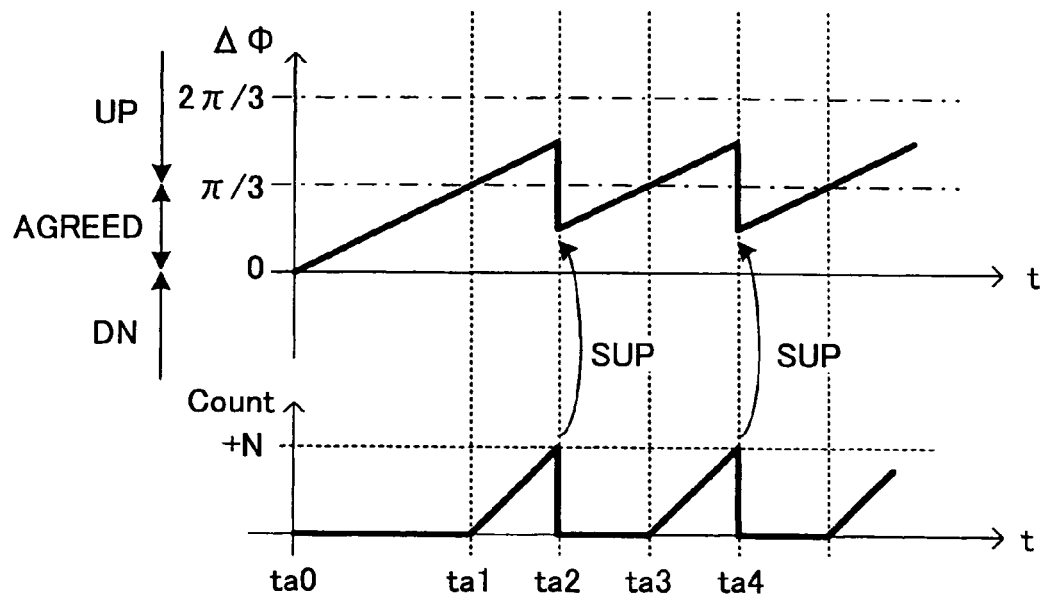
FIG. 11A and FIG. 11B are diagrams illustrating bit synchronization of the data recovery circuit according to the first embodiment of the invention.
Figure 11B:
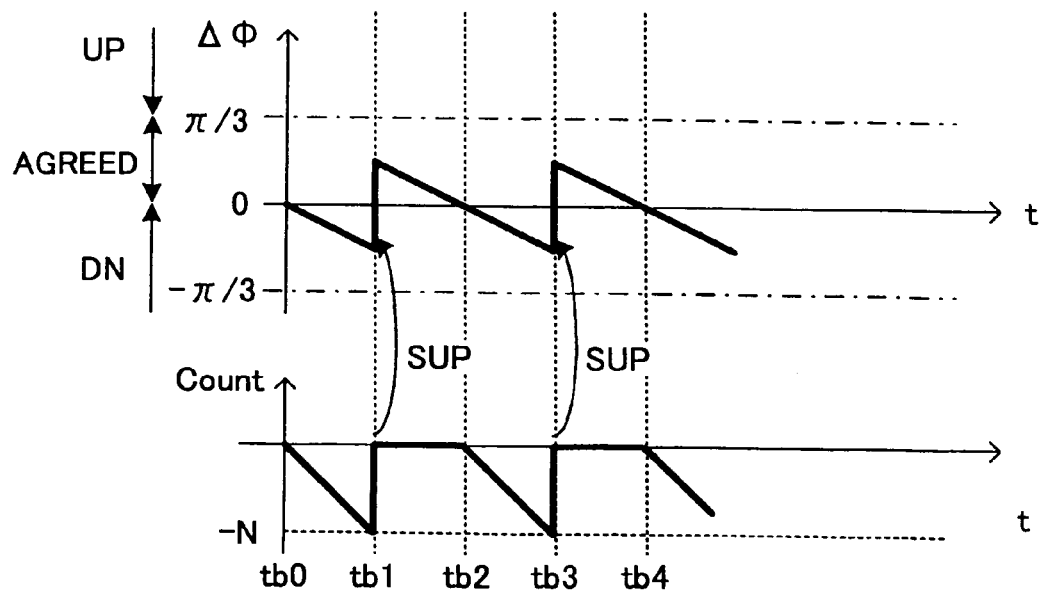

FIG. 11A and FIG. 11B are diagrams for explaining the bit synchronization in the data recovery circuit according to the embodiment of the invention. The diagram of FIG. 11A applies when f1 is greater than f2 (f1>f2), and the diagram of FIG. 11B applies for f1<f2.

In FIG. 11A and FIG. 11B, ΔΦ denotes the phase difference between the received data and the clock pattern CKP, which takes a positive value when the phase of the received data advances. It is assumed that at time ta0 and tb0 the clock pattern falls in sync with CK0 (phase state st0) with the phase consistent with that of the received data. The label "Count" represents the counter value.

(1) Case for f1>f2

The phase difference ΔΦ gradually increases. Since the phase of the clock pattern is compared with the oversampled discrete data (received data) OVSD, it can be regarded that these phases agree with each other when ΔΦ ranges from 0 to π/3. When the phase difference exceeds π/3, that is, when time exceeds ta1, the phase advancing (UP) signal becomes "H", and the counter value of the counter 22 increases. When the counter value reaches a prescribed value (e.g., +N) at time ta2, the SUP signal is set to "H" to advance the phase. As a result, the phase of the clock pattern CKP advances by π/3, and the phase difference ΔΦ decreases by π/3.

(2) Case for f1<f2

The phase difference ΔΦ gradually decreases. When the phase difference is negative (ΔΦ<0), a phase delay (DN) signal is detected, and the counter value decreases. When the counter value reaches a prescribed value (−N in this case) at time tb1, the SDN signal is set to "H" to delay the phase. As a result, the phase difference ΔΦ increases by π/3.

These operations are repeated to achieve the bit synchronized state. It should be noted that steady-state phase error exists.

FIG. 12 is a diagram used to explain the relation between phase error and jitter tolerance. The upper pattern indicates an eye pattern with phase difference ΔΦ of zero (ΔΦ=0), which is labeled as case (a), and the lower pattern indicates an eye pattern with phase difference ΔΦ of π/2, labeled as case (b). In these eye patterns, the hatched portions represent jitter regions in which data cannot be accurately recovered. The center portion sandwiched by the jitter regions is called an opening, in which area data can be recovered accurately.

If the phase state is St0, the falling edge of the clock pattern CKP is at phase 0. At this time, phase 3 of the selection signal Sel is "1", and the oversampled data OVSD[3] (and OVSD [9]) sampled at phase 3 are restored. With the jitter illustrated in FIG. 12, phase 3 resides in the eye opening both for ΔΦ=0 and ΔΦ=π/2, and the data can be restored accurately. However, as the jitter increases, accurate data recovery may not be performed especially when phase error occurs as in case (b). In this case, the number of phases of the multiphase clock is increased so as to reduce the steady state phase error.

Figure 13:
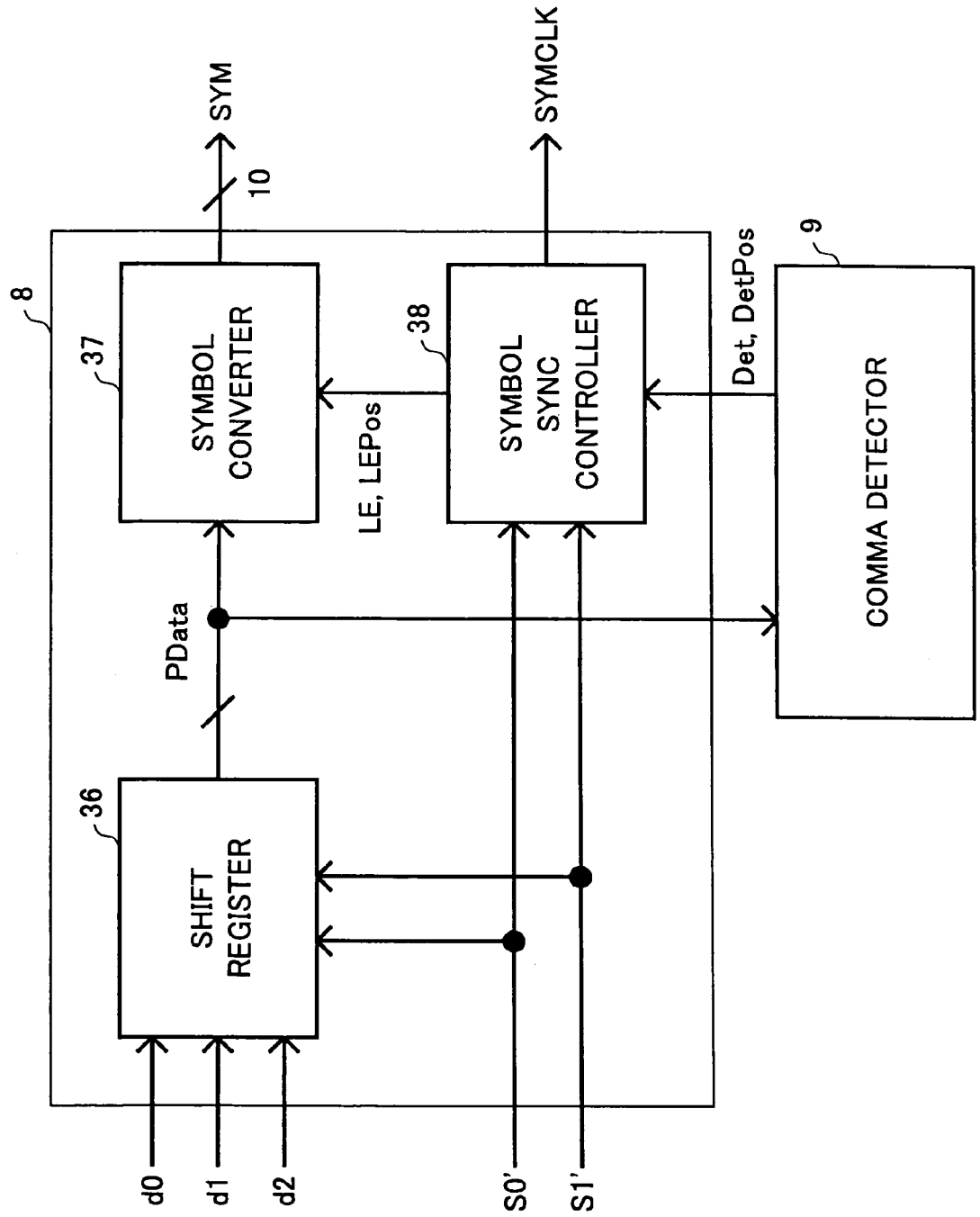
FIG. 13 is a block diagram illustrating an example of the deserializer used in the data recovery circuit.

FIG. 13 is a block diagram of a deserializer 8 used in the data restoration unit 3 shown in FIG. 4. The deserializer 8 includes a shift register 36 to which restored data items d0, d1 and d2 are input, a symbol converter 37, and a symbol synchronization controller 38. The shift register 36 successively shifts and holds the restored data items d0, d1 and d2 according to the state signal S0' and S1', and outputs parallel data (PData).

Figure 14:
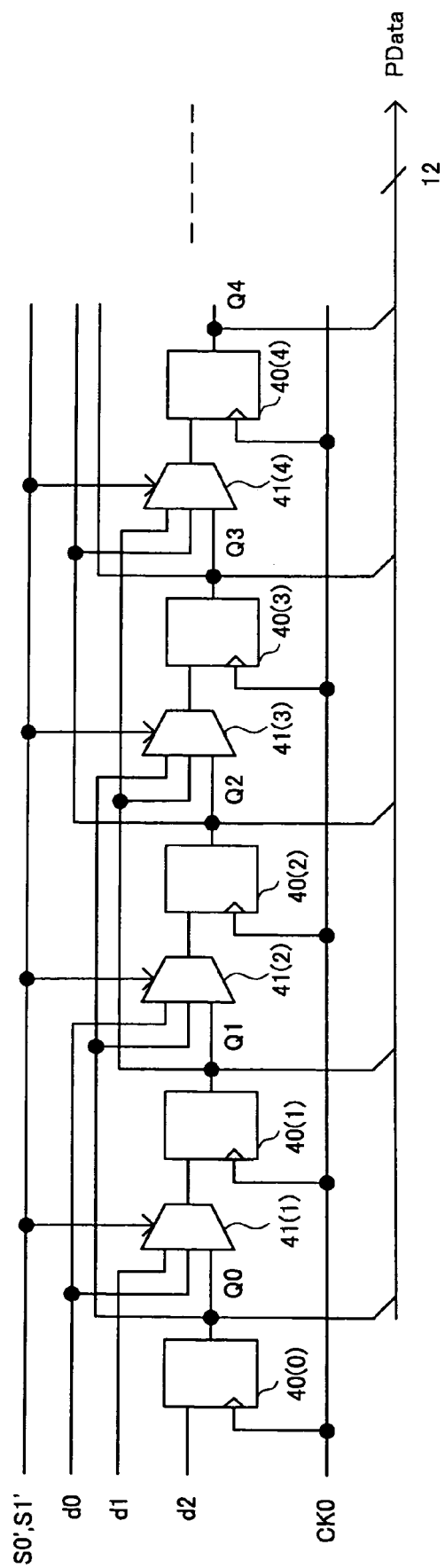
FIG. 14 is a circuit diagram illustrating the detailed structure of the shift register used in the deserializer.

FIG. 14 is a circuit diagram of the shift register 36 shown in FIG. 13. The shift register 36 includes flip flops (registers) 40(0)-40(11), and multiplexers 41(1)-41(11). The flip flops 40(0)-40(11) are cascaded to form a shift register. Each of the multiplexers 41(1)-41(11) selects one input among the three input terminals according to the state signals S0' and S1' and outputs the selected one to the associated flip flop. Based on this selection, the shift amount is switched, and one of the data items d0, d1 and d2 is selectively input to the flip flop (register element). In FIG. 14, the rest of the flip flops (F/F 40(5) and the subsequent ones) are omitted.

The three inputs to each multiplexer correspond to 3-bit shift, 2-bit shift and 1-bit shift, respectively from the top. If S1' is "H", the top input is selected and output. If S0' is "H", the bottom one is selected. In the rest of the cases, the center one is selected. The twelve flip flops 40 output the register outputs Q0-Q11, which define the parallel data PData [0:11]

output from the shift register 36. In this manner, the recovered data item with 1, 2 or 3 bits is converted to parallel data PData.

The comma detector 9 shown in FIG. 13 determines whether a prescribed comma code pattern is contained in the parallel data PData supplied from the deserializer 8 (to be more precise, from the shift register 36 of the deserializer 8). The comma detector 9 supplies the detection result Det and the detected position (DetPos), if detected, to the deserializer 8. The detected position is indicated by, for example, the bit number of the LSB of the detected comma code pattern.

The comma code in 8b/10b conversion is "0011111010" or "1100000101", where the left end bit is the first received bit (FRB). Another code pattern, such as "0011111001" or "1100000110", having the attributes indicating the symbol delimiter may be detected.

For example, if PData [11:0] is "100111110101", then PData [10:0] agrees with the comma pattern, and therefore, detection signal Det is set to "H", and DetPos=1 is output as the detected position DetPos.

FIG. 15A is a timing chart showing various waveforms used to explain the symbol synchronization unit 38 and the symbol converter 37 shown in FIG. 13, and FIG. 15B is a enlarged view of a part of the timing chart of FIG. 15A. In FIG. 15A and FIG. 15B, PData[11] represents the first received bit (FRB), and PData[0] is the last received bit (LRB). Waveform (a) represents clock CK0, waveform (b) represents PData [11:0], waveform (c) represents detection signal Det, waveform (d) represents detected position signal DetPos, waveforms (e-1) and (e-2) respectively represent state signals S0" and S1', waveform (g) represents dPData delayed by one clock from the parallel data PData, waveform (h) represents symbol clock SYMCLK (which is identical to latch enable signal LE), waveform (i) represents symbol position signal LEPos indicating the symbol effective position of the parallel data PData, and waveform (j) represents a 10-bit symbol signal SYM.

If a comma pattern COM (which is the underlined portion in waveform (b) shown in FIG. 15B) is detected from the parallel data PData, the comma detector 9 outputs a detection signal Det (waveform (c)) and a detected position signal DetPos (waveform (d)). The symbol synchronization controller 38 has a built-in counter, and starts counting in response to the detection signal Det as a trigger, using the detected position signal DetPos as the initial value. The counter counts the number of bits of the output data items (each consisting of 1, 2 or 3 bits), based on the state signals S0' and S1'. Every time the counter value reaches 10 (every 10 bits defining a symbol), the symbol synchronization controller 38 outputs a latch enable signal LE (waveform (h)), and sets the counter value to −10. At the same time, the symbol synchronization controller 38 outputs the counter value as a symbol position signal LEPos (waveform (i)) which indicates the effective position of the parallel data PData. The counting is performed using state signals S0" and S1" (labeled (e-1) and (e-2)) delayed by two clocks. If S0" is "H", the counter is incremented by 1. If S1" is "H", the counter value increases three. In the rest of the cases, the counter value increases two.

In the symbol converter 37, a 10-bit symbol SYM [0:9] labeled (j) is extracted from dPData (labeled (g)) one-clock behind the parallel data pData, according to the symbol position signal LEPos, when the latch enable signal KE becomes "H". If the symbol position signal LEPos is 0, 1, or 2, then dPData [9:0], [10:1], or [11:2] are extracted. The LEPos signal does not exceed 2 because data are extracted at the previous clock with LEPos≧3. The same signal as the latch enable signal LE is output as a symbol clock SYMCLK.

Thus, the 10-bit symbol SYM is recovered in sync with the symbol clock SYMCLK. The period of the symbol clock SYMCLK generally corresponds to five clocks of CK0, and to ten clocks of transmission clock. However, due to the frequency difference between the transmission end and the receiving end, the symbol clock occasionally corresponds to four or six clocks of CK0. This variation can be absorbed by the elastic buffer EB 111 shown in FIG. 3.

Figure 16:
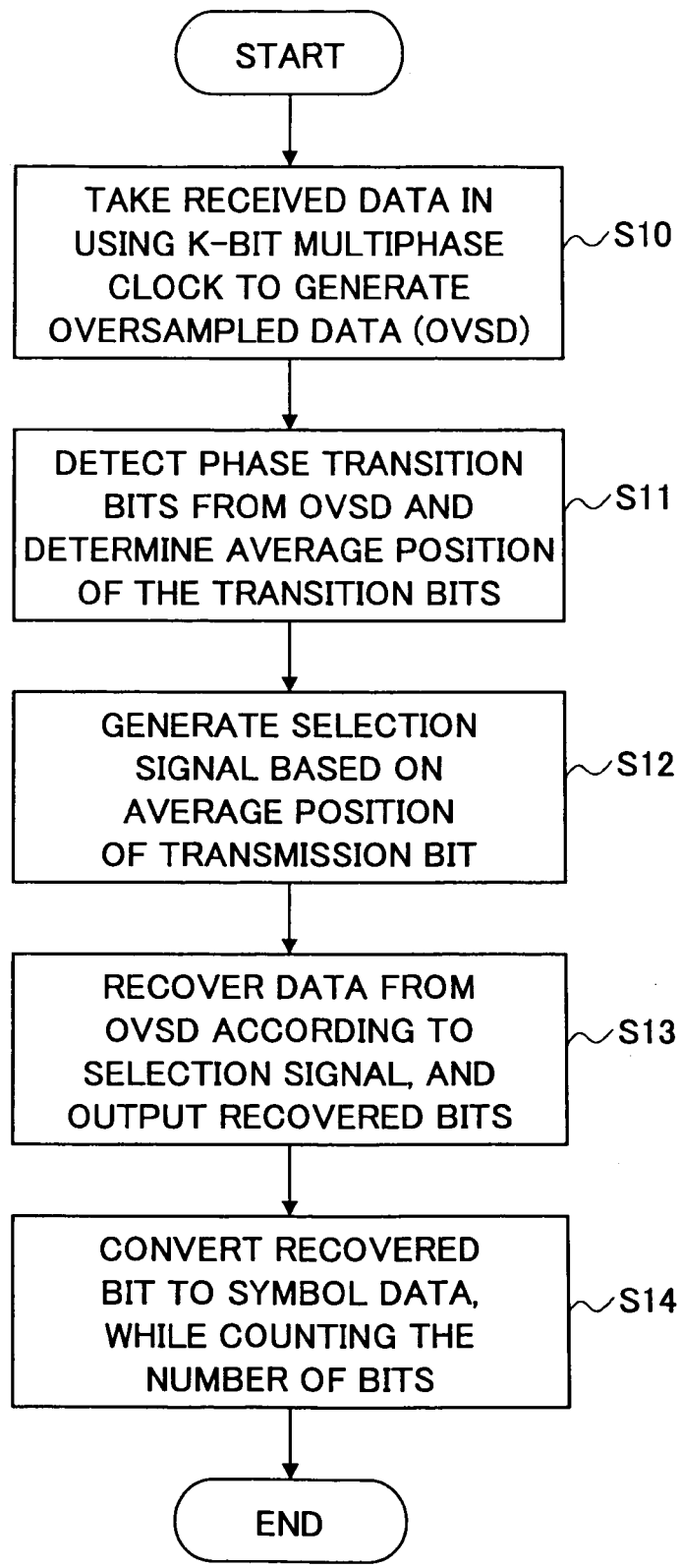
FIG. 16 is a flowchart of the data recovery method according to the first embodiment of the invention.

FIG. 16 is a flowchart of the data recovery method according to the first embodiment. The received data are taken in using k-bit multiphase clock signals with phases shifted at regular intervals, and oversampled data OVSD [0:11] are generated (step S10). In this example, the frequency f2 of the multiphase clock is half of the transmission clock frequency f1 of the received data, and 12-phase (k-phase) clocks are generated, while shifting the phase by 1 bit. However, the present invention is not limited to this example.

FIG. 17A illustrates an example of the oversampled data OVSD. The left column "i" indicates the OVSD line number, and the most left bit OVSD [0] is the first received bit (FRB).

Returning to FIG. 16, the position of the transition bit at which the logical value is inverted (from "0" to "1" or from "1" to "0") is detected, and the positions of the transition bits (that is, the edge positions) are determined for each OVSD line. Then, the average position of the transition bits is determined over several lines (step S11).

FIG. 17B illustrates both-edge signal RxEdge indicating the edges or the detected bit positions. For the first line of OVSD, logical inversion is conducted between bit numbers [0] and [1], and between bit numbers [6] and [7]. Accordingly, RxEdge [0:11] becomes "010000010000". The first bit [0] of RxEdge indicates bit transition from the last bit [11] of the previous line. The edge data RxEdge are detected over a predetermined number of lines, and the average position of the transition bits is determined. Since the position of the transition bit is repeated at intervals of integral multiples of 12/2 (k/2), the average position is located between 0 and 5. The average position is 1 for the first few lines, then the average position shifts to 2 in the middle. For the last lines, the average position becomes 3.

Returning again to FIG. 16, a selection signal Sel is generated based on the average position of the bit transition (step S12). For example, the selection signal Sel is obtained by adding a prescribed value (3, for example) to the average position. Thus, the center position of the clock of the received data is determined.

FIG. 17C illustrates an example of selection signal Sel. The selection bit (or the effective bit) appears at bit numbers [4] and [10]. For these lines at which the average bit position shifts from 2 to 3, or 3 to 2, a special pattern of selection signal "000000100000" or "100001000001" is output because the selection bit shifts across the lines.

Returning again to FIG. 16, the bits designated by the selection signal Sel are extracted from the oversampled data OVSD, and the extracted bits are recovered and output (step S13).

FIG. 17D illustrates an example of recovered data item RecData, and FIG. 17E illustrates the number of recovered bits for each line (Val). As illustrated in FIG. 17E and as is described above, the number of bits recovered from the OVSD is generally two. However, when the selection signal Sel has a special pattern, the number of bits to be recovered becomes 1 or 3.

Returning again to FIG. 16, the recovered data RecData are converted to 10-bit symbol data, while counting the number of bits (step S14). The symbol delimiter is determined by detecting a comma code COM, and counting is started from the comma code to implement symbol conversion. Since the comma code is inserted at a prescribed interval, the position of the delimiter is checked every time the delimiter is detected. If a synchronization error occurs, the error is corrected.

Figure 18:
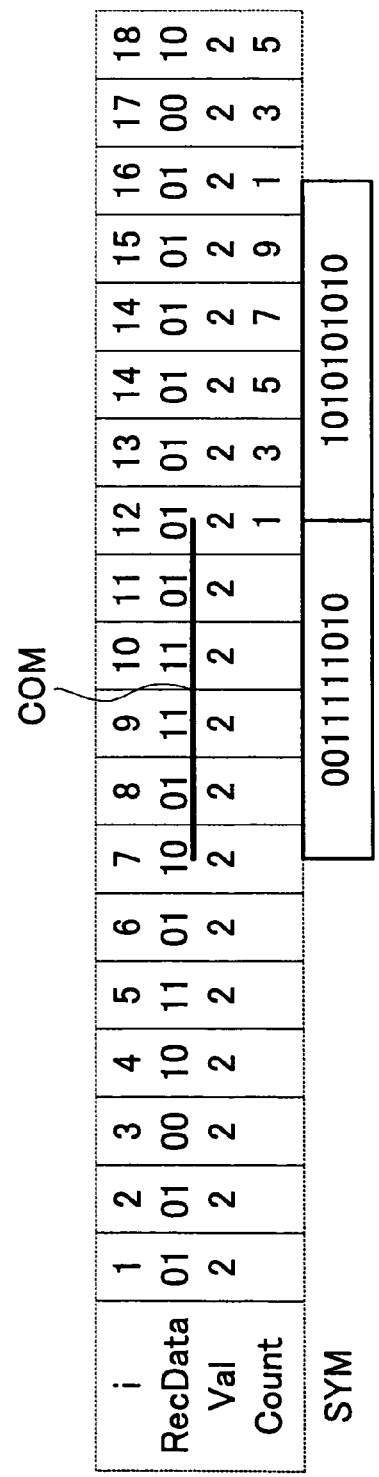
FIG. 18 is a diagram used to explain conversion to symbol data.

FIG. 18 is a table used to explain the conversion to symbol data. The first line "i" represents the line number, the second line RecData represents recovered data, the third line Val indicates the number of recovered bits, and the last line Count indicated the count value (that is, the number of bits) starting from the comma code.

When a comma code "0011111010" is detected (as underlined in RecData), the counter is initialized to "1", and is incremented for every recovered bit. Every time the counter value reaches 10, a 10-bit symbol data SYM is generated. Then, the counter is initialized again.

With this data recovery method, accurate data recovery is realized because the received data are recovered from oversampled data sampled at multiphase clock frequency f2 independent of the clock frequency f1 of the transmission data. By setting f2 so as to half of f1, the received data are easily recovered even if the transmission rate is high.

Figure 19:
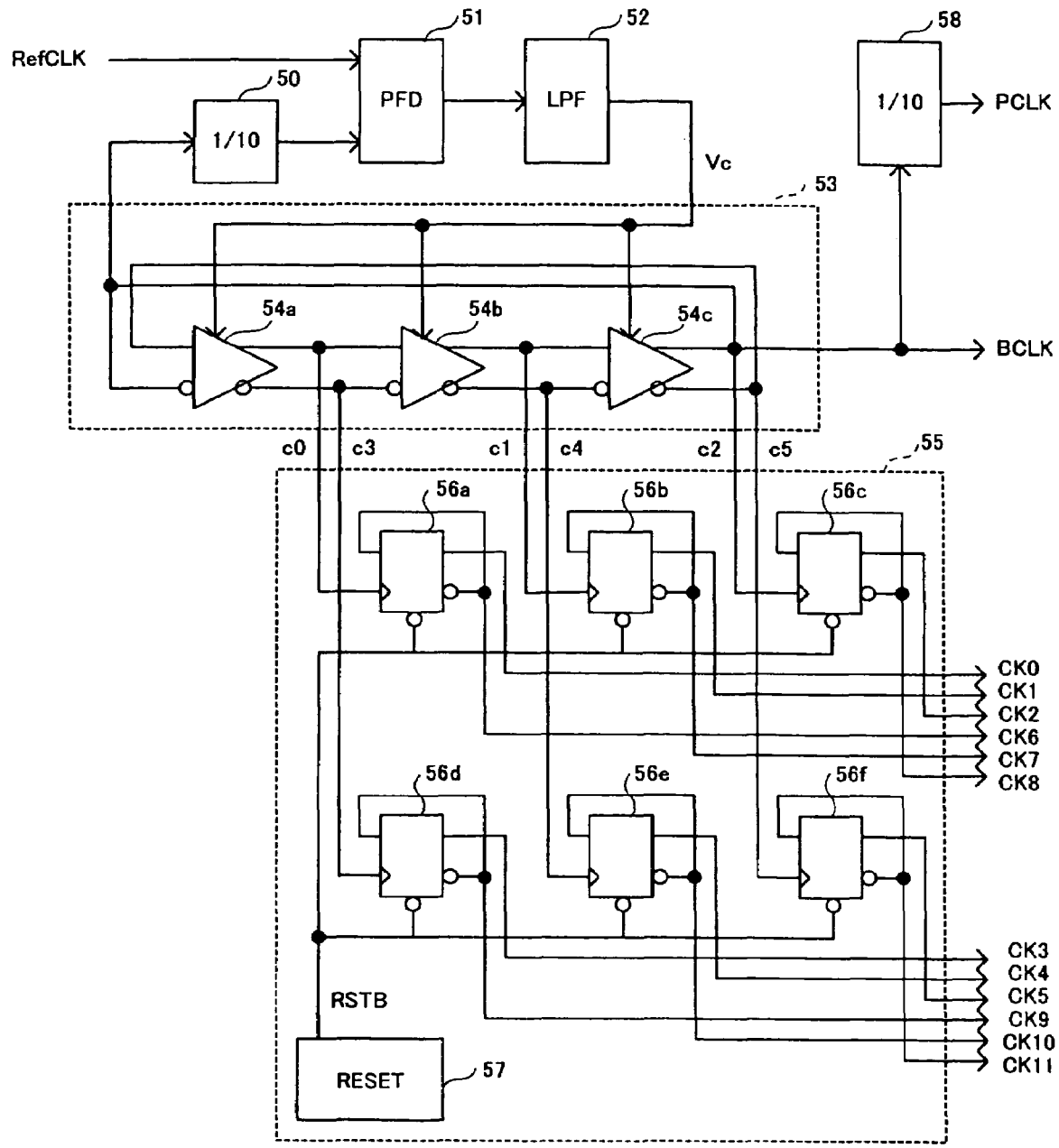
FIG. 19 is a circuit diagram illustrating the structure of the phase locked loop (PLL)

FIG. 19 is a block diagram of a phase locked loop (PLL) 113 used in the first embodiment (See FIG. 3). The PLL 113 includes a frequency divider 50, a phase frequency detector (PFD) 51, a low pass filter (LPF) 51, a voltage control oscillator (VCO) 53, a frequency divider 55, and a frequency divider 58. The PLL 113 generates a transmission clock BCLK, an internal operating clock PCKL, and multiphase clocks CK0-CK11 based on the reference clock RefCLK.

The voltage control oscillator VCO 53 is a ring oscillator having three differential buffers 54a, 54b, and 54c. The VCO 53 produces 6 phase-shifted clocks co-c5, one of which is output as the transmission clock BCLK.

The divider 50 divides the transmission clock BCLK by 10, and feeds the one-tenths (1/10) of the transmission clock back to the phase frequency detector (PFD) 51. The PFD 51 compares the output from the divider 50 with the reference clock RefCLK, and drives the built-in charge pump (not shown) based on the detected phase difference.

The low pass filter (LPF) 52 smoothes the output of the charge pump, and supplies a control voltage Vc to the VCO 53.

The delays of the differential buffers 54a-54c of the VCO 53 change according to the control voltage Vc to perform phase synchronization control. For example, if a 250 MHz reference clock RefCLK is supplied, then a 2.5 GHz transmission clock BCKL is generated. The divider 58 divides the transmission clock BCKL by 10 to generate the internal operating clock PCKL.

The divider 55 includes 6 half dividers 55a-55f (structured by, for example, toggle flip flops), each of which provides a normal output and an inverted output. The half dividers 56a-56f are reset by the output RSTB of the reset circuit 57, and the phases of the outputs are regulated so as to form CK0-CK11, which are illustrated in FIG. 5 as waveforms (c-0) to (c-11). Six phase clocks c0-c5 are divided by 2, and 12 phase clocks CK0-CK11 are generated at half frequency of the transmission clock BCKL.

Figure 20:
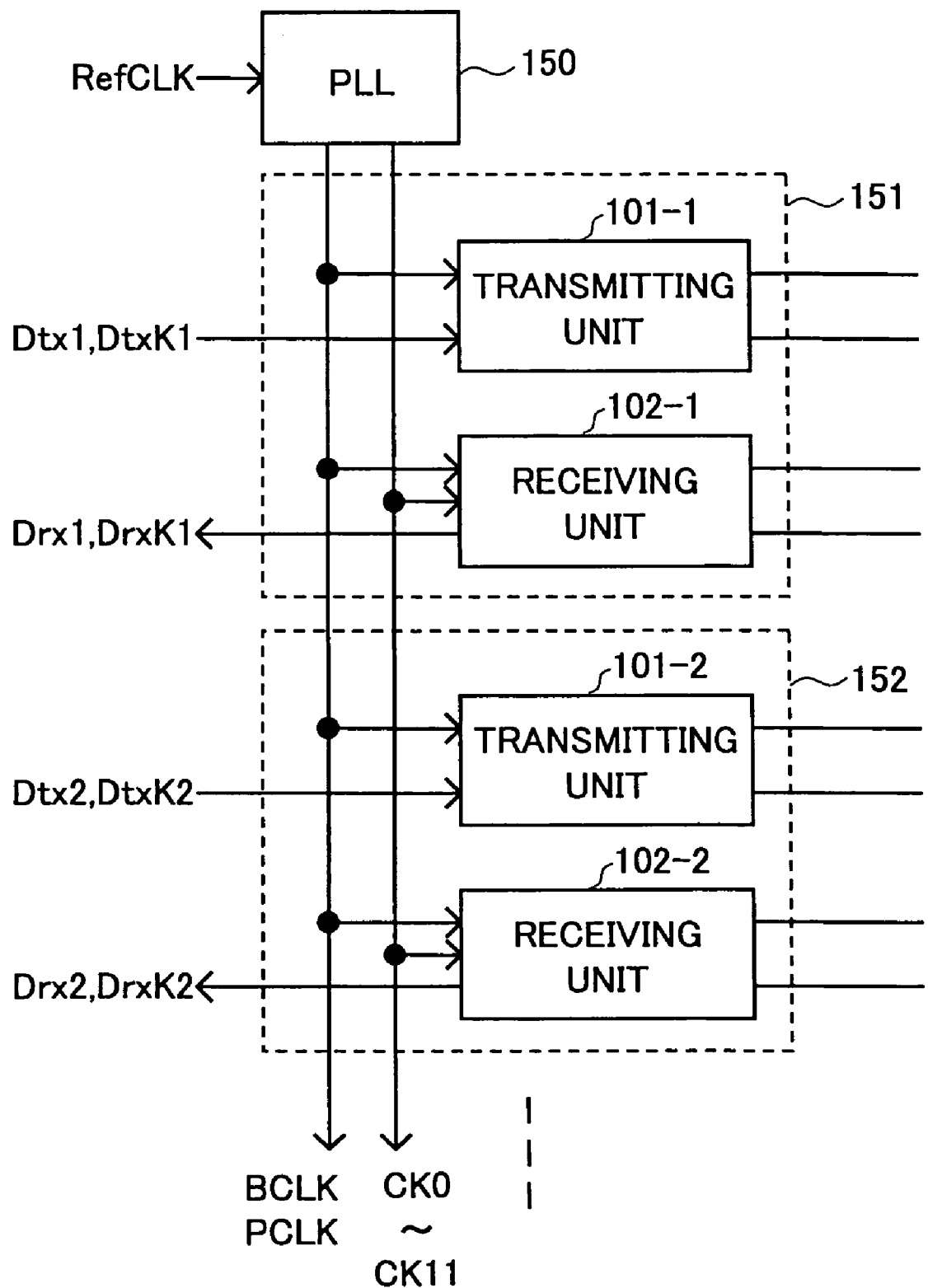
FIG. 20 is a block diagram illustrating the PLL and multiple physical layers.

FIG. 20 illustrates the PLL 150 used in common among multiple physical layers (e.g., the first lane physical layer 151 and the second lane physical layer 152). The PLL 150 shown in FIG. 20 also functions as a multiphase clock generator, and generates a transmission clock BCKK, an internal operating clock PCKL, and multiphase clocks CK0-CK11, based on the externally supplied reference signal RefCLK. These clocks are supplied from the PLL 150 in common to the multiple physical layers (such as the physical layers 151 and 152).

The first lane physical layer 151 includes a transmission unit 101-1 and a receiving unit 102-1 to which the data recovery circuit of the first embodiment is applied. The transmission clock BCLK and the internal clock PCKL are supplied to the transmission units 101-1 and 101-2, while the multiphase clocks CK0-CK11 are supplied to the receiving units 102-1 and 102-2.

The data recovery circuit according to the embodiment generates a multiphase clock based on an independent reference clock to oversample the received data, without recovering the embedded clock directly from the received data. The received data are oversampled using separately generated multiphase clocks, and the received data and symbols are recovered from the oversampled data. To be more precise, the selection signal generator 7 virtually recovers the clocks embedded in the received data as the clock pattern CKP from the oversampled data, and generates a selection signal based on the clock pattern CKP. The data selector 6 recovers data according to the selection signal. The greater part of the circuit, other than the oversampling unit 1, operates at a single clock CK0, and therefore, the data recovery circuit can respond to increased transmission rate, without worrying about skews between multiphase clocks or between data sets. In addition, recently developed circuits or layout design verification tools can be applied to the circuit easily. Thus, simplification of circuit design and reusability of the circuit are improved, and consequently, the development period can be reduced. Since the data are converted so as to be suitable for parallel processing in the above-described embodiment, the operating frequency can be reduced, easily responding to high transmission rates.

Although, in the embodiment, oversampling is carried out at twelve phases at half frequency of the transmission clock, oversampling may be conducted at twenty four phases at a quarter frequency of the transmission clock. The operating frequency may be further reduced to respond to further increased data transmission rates.

Since the data are recovered using a clock unsynchronized with the received data, generation of multiphase clocks and generation of transmission clocks can be carried out in common, and the chip size can be reduced.

Second Embodiment

The second embodiment of the present invention is now described. In the second embodiment, the selection signal generator 7 and the data selector 6 used in the symbol data restoration unit 3 of the first embodiment are modified, and the other structures are the same. Accordingly, explanation is made focusing on the selection signal generation and data selection.

Figure 21:
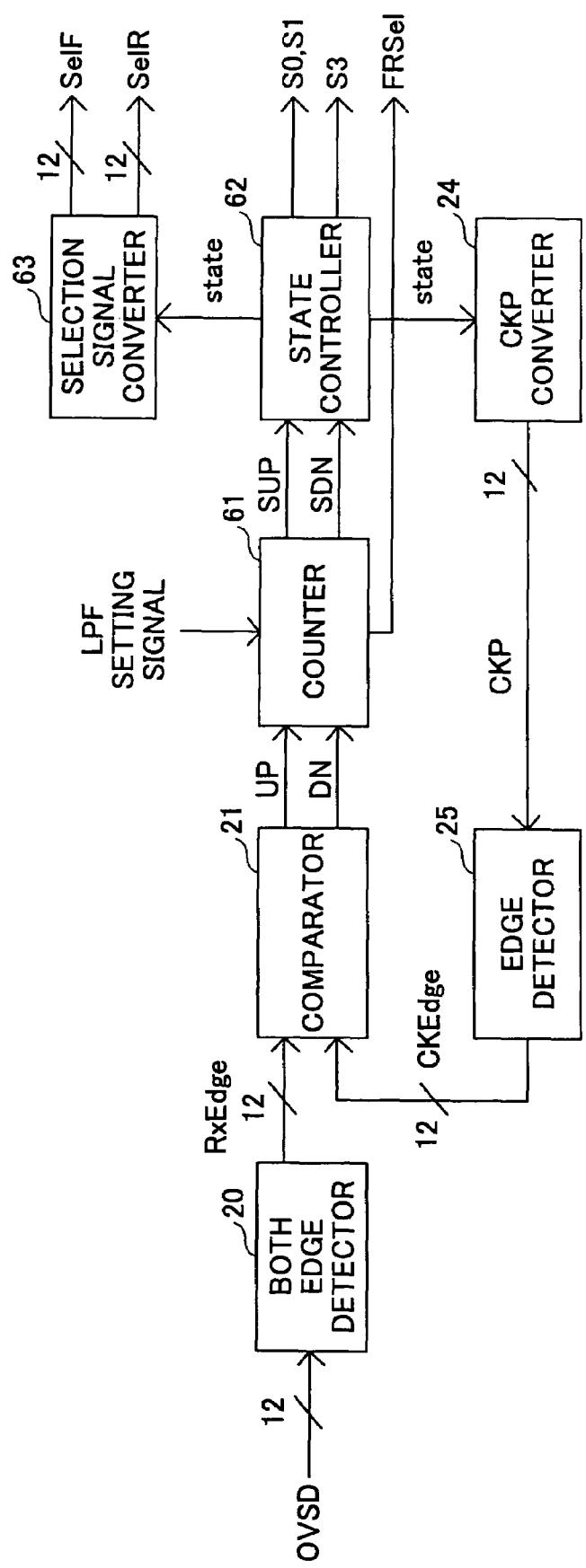
FIG. 21 is a block diagram illustrating a selection signal generator used in a data recovery circuit according to the second embodiment of the invention.

FIG. 21 is a block diagram of the selection signal generator used in the data recovery circuit according to the second embodiment of the invention. In the selection signal generator shown in FIG. 21, signals output from the counter 61, the state controller 62, and the selection signal converter 63 are different from those illustrated in the first embodiment in FIG. 6. The other components, that is, the both edge detector 20, the comparator 21, the CKP converter 24, and the edge detector 25 are the same as those shown in the first embodiment. The same components with the same functions as those of the first embodiment are denoted by the same numerical references.

The selection signal generator shown in FIG. 21 generates two selection signals SelR and SelF for indicating the phase of data acquisition from the oversampled data OVSD. Simultaneously, the state signals S0 and S1 for defining the number of effective bits are also generated. A signal FRSel for selecting one of the two selection signals S0 and S1 is also generated.

The first selection signal SelR becomes "1" at the rising edge of the clock pattern signal CKP, just like the selection signal Sel of the first embodiment. The second selection signal SelF is a signal 1-sampling time earlier than the first selection signal SelR (with the phase advancing by ⅙ period).

The counter 61 counts the UP signals or the DN signals output from the comparator 21, and outputs SUP signal or a SDN signal based on the counting result. The counter 61 also outputs the FRsel signal for indicating which one of the selection signals is effective, based on the counter value.

When the current value of the counter 61 is positive, the FRSel signal is set "H", indicating that the second selection signal SelF is the effective one. If the counter value is negative, the FRSel signal is set "L", which represents that the first selection signal SelR is effective. If the current counter value is zero, the previous signal level is taken over.

The state controller 62 regulates the six states St0-St5 representing the phase states of the clock pattern CKP according to the SUP signal or the SDN signal supplied from the counter 61, and output a state signal indicating the current state, as well as the state signals S0, S1 and S3. The state signals S0 and S1 represent phase transitions from St4 to St3 and from St3 to St4, respectively, as in the first embodiment. The state signal S3 indicates that the phase state resides in St3.

The selection signal converter 63 converts the state signal into the selection signals SelF and SelR.

Figure 22:
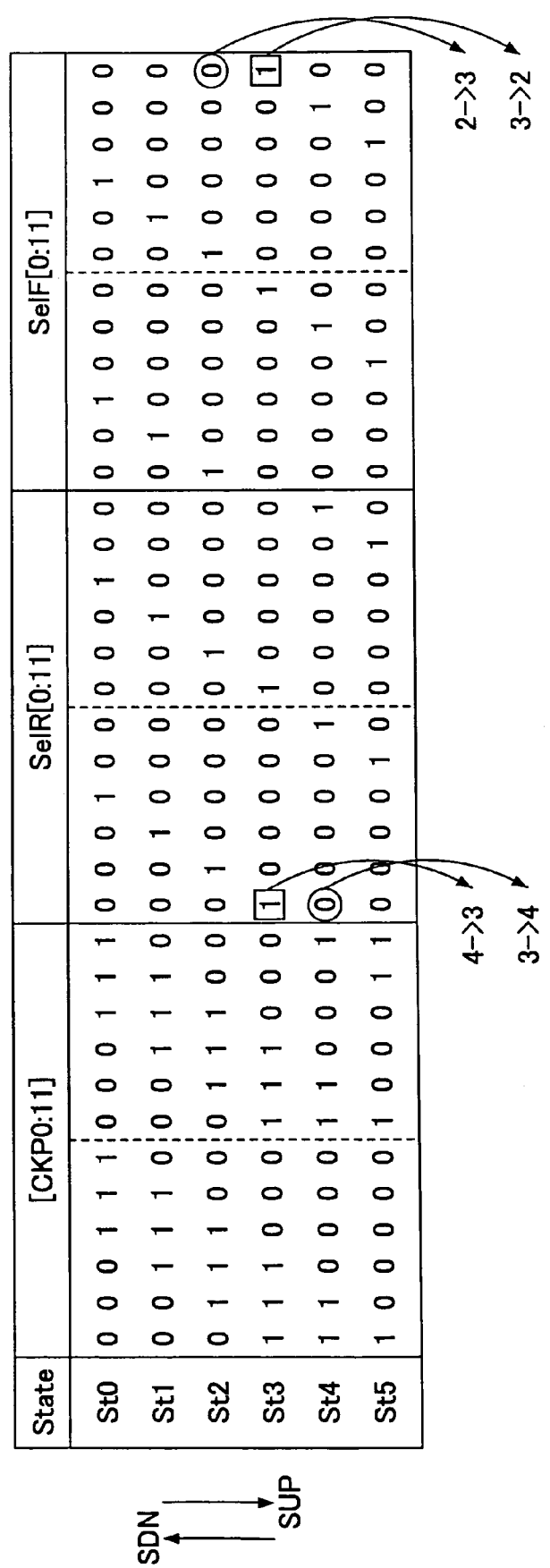
FIG. 22 is a table illustrating an example of conversion rule for converting the state signal to selection signals SelF and SelR.

FIG. 22 illustrates an example of the conversion rule for converting the state signal to selection signals SelF and SelR. The state signal transitions from St0 toward St5 in response to the SUP signal, and transitions from St5 toward St0 in response to the SDN signal, as in the first embodiment. The squared bits shown in selection signals SelF [0:11] and SelR [0:11] are generally "1", and transition to "0" when the phase state shifts in the SDN direction. Accordingly, immediately after the phase has transitioned from St4 to St3 (St4→St3), SelR [0:11] becomes "000000100000". Similarly, immediately before the phase transitions from St3 to St2 (St3→St2), SelF [0:11] is "000001000000". The circled bits are generally "0", and transition to "1" when the phase state shifts in the SUP direction. Immediately after the phase has transitioned from St3 to St4 (St3→St4) SelR [0:11] becomes "100001000001". Similarly, immediately before the phase transits from St2 to St3 (St2→St3), SelF [0:11] is "100000100001".

Figure 23:
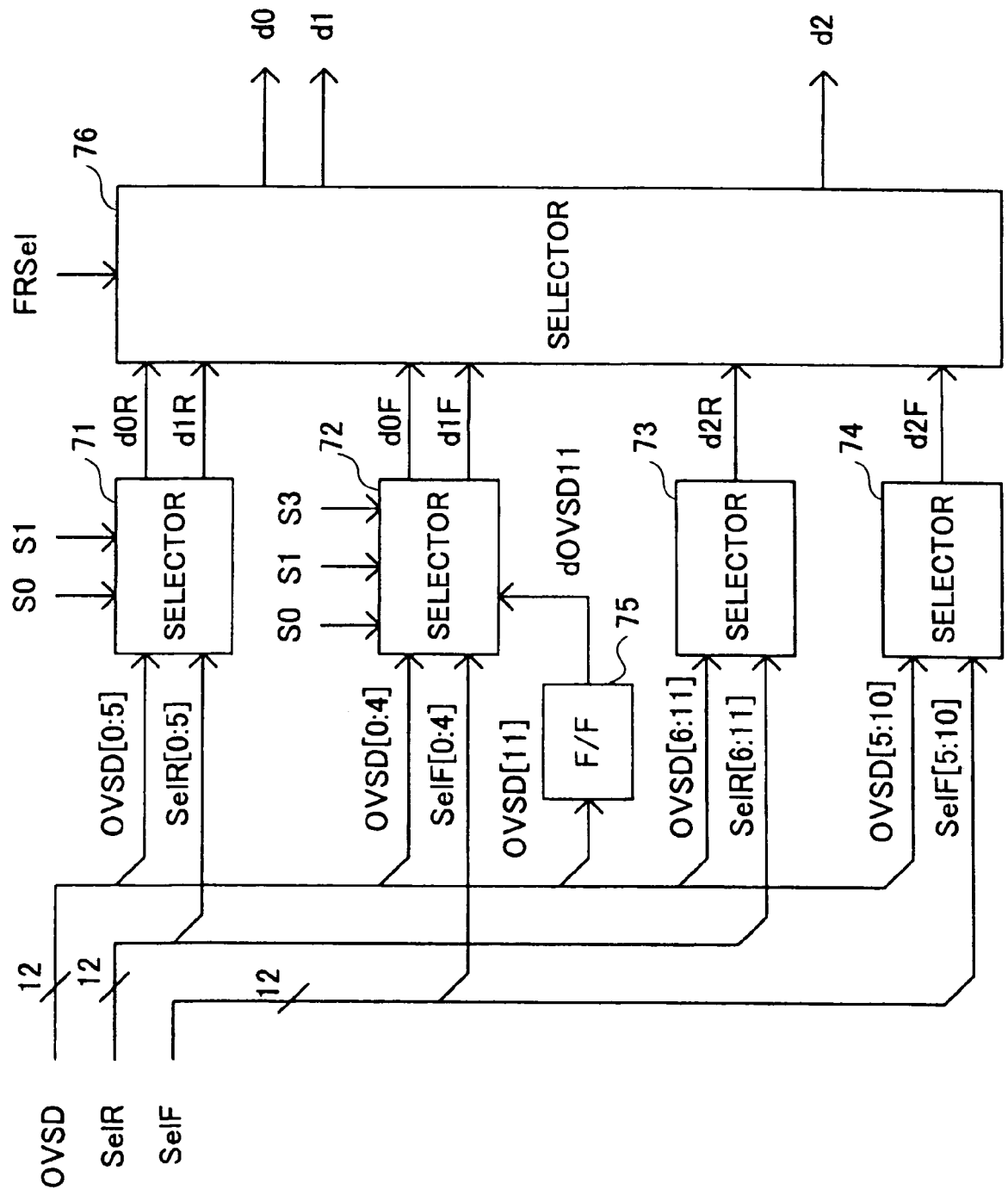
FIG. 23 is a block diagram of a data selector used in a data recovery circuit according to the second embodiment of the invention.
Figure 24:
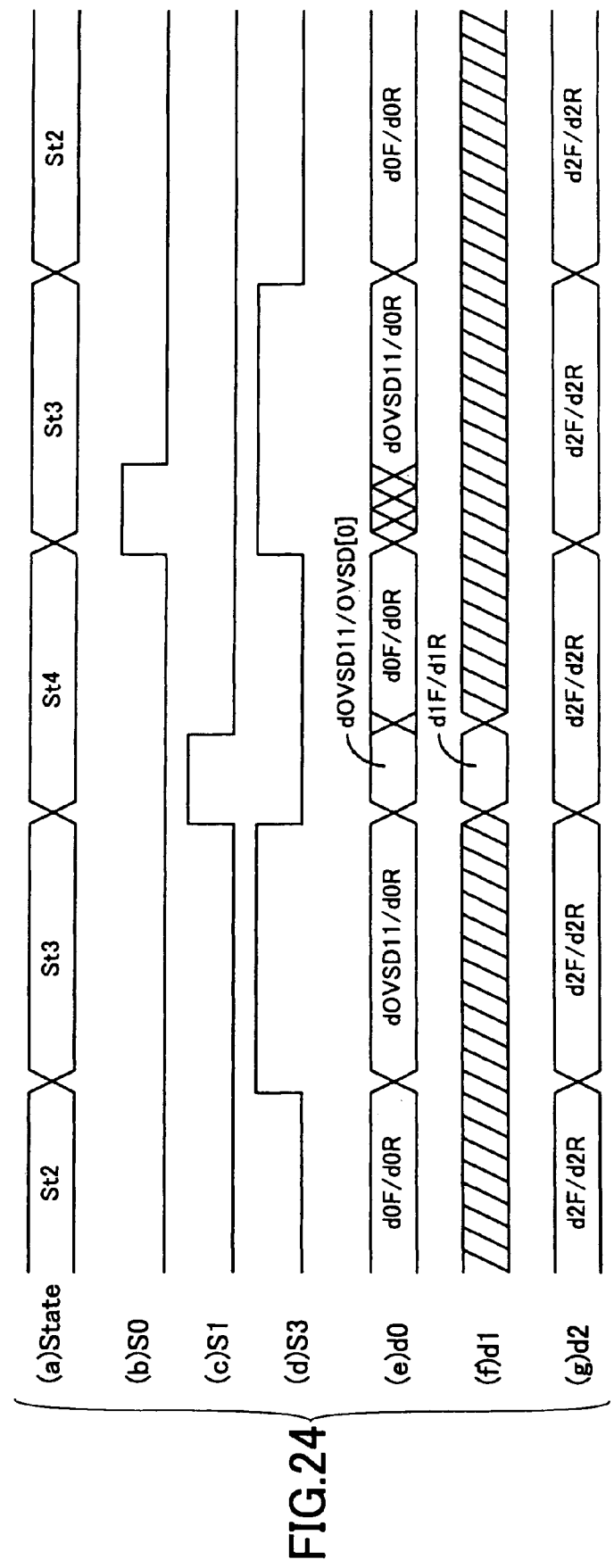
FIG. 24 is a timing chart of signals output from the data selector.

FIG. 23 is a block diagram of the data selector used in the data recovery circuit according to the second embodiment of the invention, and FIG. 24 is a timing diagram showing various signals output from the data selector.

The data selector shown in FIG. 23 includes selectors 71-74, a flip flop (F/F) 75, and a selector 76.

The selector 71 recovers data d0R and D1R from oversampled data OVSD [0:5], according to the selection signal SelR [0:5] and the state signals S0 and S1 supplied from the selection signal generator.

The selector 72 recovers data d0F and D1F from oversampled data OVSD [0:4] and delayed data dOVSD11 one-clock delayed from OVSD [11] by the flip flop 75, according to the selection signal SelF [0:4] and the state signals S0, S1 and S3 supplied from the selection signal generator.

The selector 73 recovers data d2R from oversampled data OVSD [6:11], according to the selection signal SelR [6:11].

The selector 74 recovers data d2F from oversampled data OVSD [5:10], according to the selection signal SelF [5:10].

The selector 76 selects d0R/d0F, d1R/d1F, and d2R/d2F according to the selection signal FRSel, and outputs recovered data items d0, d1 and d2.

If the FRSel signal is "H", data items represented by symbols with F at the end are selected. If FRSel is "L", data items represented by symbols with R at the end are selected.

The data items d0R, d0F, d1R, d1F, d2R, and d2F are converted according to the following rule:

If S0=H, ignore d0R, d0F, d1R, and d1F;
If S1=H, convert d0R, d0F, d1R and d1F so as to be d0R=OVSD[0], d0F=dOVSD[11], d1R=OVSD[5], and d1F=OVSD[4];
If S0=S1=L, convert d0R to logical product OVSD[k] &SelR[k] with k varied from 0 to 5, and ignore d1R;
If S3=L, convert d0F to logical product OVSD[j]&SelF[j] with j varied from 0 to 4;
If S3=H, convert d0F to dOVSD[11], and ignore d1F; and
Regardless of S0, S1 and S3 levels, convert d2R to logical product OVSD[k]&SelR[k] with k varied from 6 to 11, and convert d2F to logical product OVSD[j]&SelF[j] with j varied from 5 to 10.

In FIG. 24, waveform (a) represents the phase state signal, waveforms (b), (c) and (d) represent state signals S0, S1 and S3, respectively, and waveforms (e), (f), and (g) represent recovered data items d0, d1 and d2, respectively.

In waveforms (e), (f) and (g), the white regions represent the data existing sections in which recovered data items d0, d1 or d2 exist, while the hatched regions and cross-marked regions represent data non-existing sections in which recovered data items do not exist. In the example shown in FIG. 24, when S0=H, only data item d2 is recovered. When S1=H, three data items d0, d1 and d2 are recovered. In the rest of the cases, two data items d0 and d2 are recovered. This effect is the same effect of the data selector of the first embodiment.

Although not shown in FIG. 23, the data selector outputs signals S0' and S1' delayed from state signals S0 and S1, respectively, by the operation time required at data selector, as in the first embodiment (See FIG. 4). With S0' and S1', the effective states of recovered data items d0, d1 and d2 are indicated, and therefore, the deserializer 8 and the comma detector 9 explained in the first embodiment can be applied as they are to the symbol data restoration unit 3.

Next, explanation is made of synchronization between the clock pattern CKP and oversampled data OVSD when the clock frequency f1 of the received data does not agree with the clock frequency f2 (which is the both edge evaluation of multiphase clocks CK0-CK11) of the receiving end.

Since the relation between the counter value and the phase difference ΔΦ (between the received data and the clock pattern CKP) is the same as that explained in the first embodiment, the jitter tolerance based on eye patterns is highlighted here.

Figure 25:
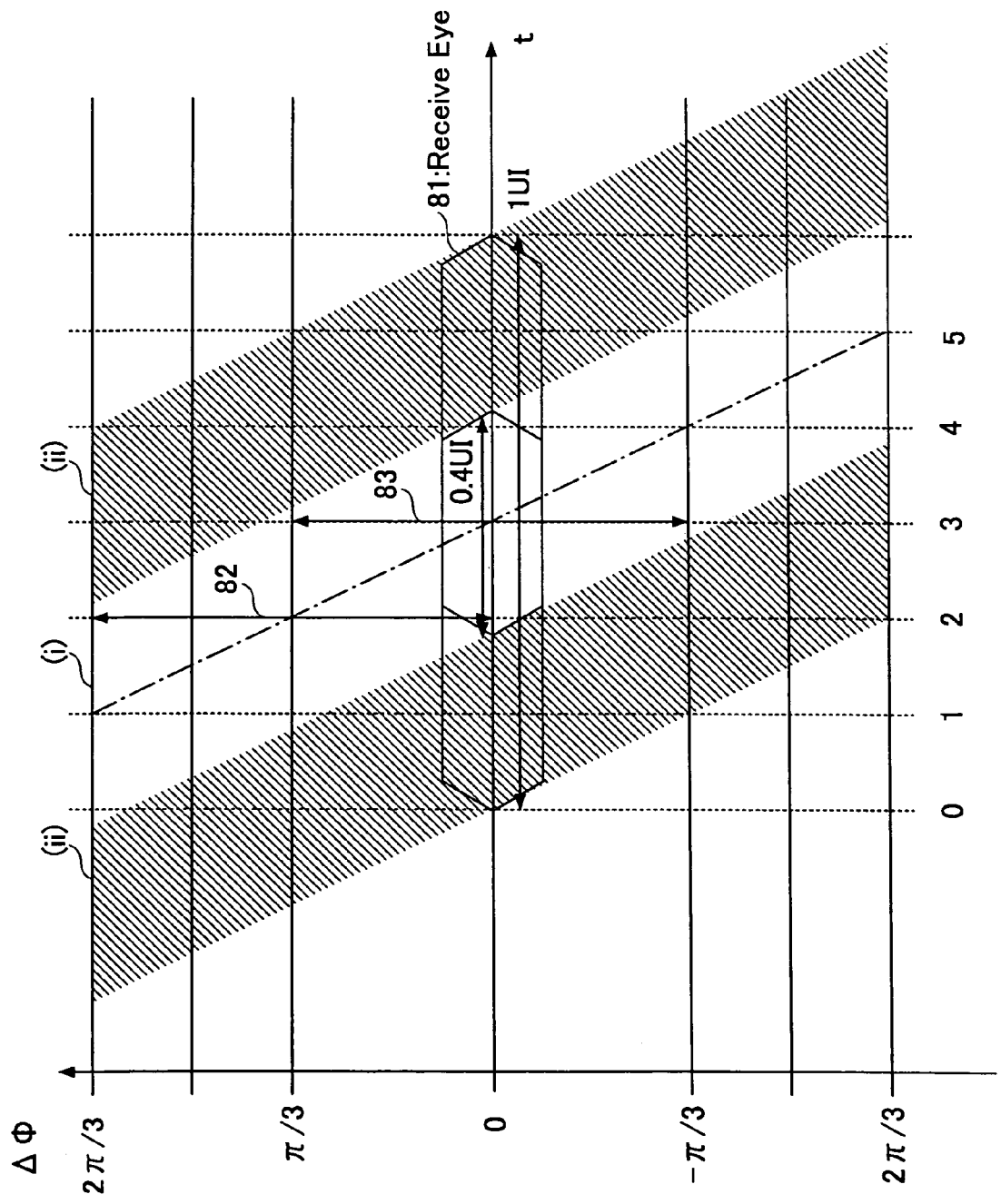
FIG. 25 is a graph showing jitter tolerance according to the second embodiment of the invention.

FIG. 25 is a diagram used to explain jitter tolerance. In the graph of FIG. 25, the horizontal axis represents time "t", and the vertical axis represents the phase difference ΔΦ between the received data and the clock pattern CKP. The shaded areas in the graph indicate jitter regions (ii), and the white region between the jitter regions represents an eye opening (i). The eye pattern 81 at ΔΦ=0 has an eye opening of 0.41 U1.

The falling edge of the clock pattern CKP is positioned at phase 0, the selection signal SelF becomes "1" at phase 2, and the selection signal SelR becomes "1" at phase 3. Accordingly, the ranges in which the data selected by selection signals SelF and SelR are correctly recovered are those indicated by the arrows 82 and 83, respectively.

By recovering the data item selected according to selection signal SelF when the counter value (that is, the phase difference $\Delta\Phi$) is positive, and by recovering the data item selected according to selection signal SelR when the counter value (that is, the phase difference $\Delta\Phi$) is negative, the acceptable range in which the received data are recovered correctly can be expanded even with phase errors.

In other words, the jitter tolerance can be improved, without increasing the number of phases of the multiphase clock to reduce the steady state phase error.

In this manner, in the data recovery method and apparatus according to the second embodiment of the invention, an independent multiphase clock unsynchronized with the transmission clock of the received data is generated, without recovering the transmission clock directly from the received data, and sampling data are acquired by oversampling the received data using the multiphase clock. The transmission clock embedded in the received data is virtually recovered as the clock pattern CKP from the oversampled data, and selection signals SelF and SelR used to extract effective bits from the oversampled data are generated, while the clock pattern CKP is compared with the oversampled data. The optimum selection signal is selected based on the comparison result, and the received data are recovered based on the optimum selection signal. With this arrangement, the acceptable range suitable to accurate data recovery can be expanded even with phase errors due to the inconsistency between the clock pattern CKP and the oversampled data, with improved jitter tolerance.

The greater part of the circuit, other than the oversampling unit 1, operates at a single clock CK0, and therefore, the data recovery circuit can respond to increased transmission rate, without worrying about skews between multiphase clocks or between data sets.

In addition, recently developed circuits or layout design verification tools can be applied to the circuit easily. Thus, simplification of circuit design and reusability of the circuit are improved, and consequently, the development period can be reduced.

By setting the multiphase clock frequency f2 to a fraction of the transmission clock f1 of the received data, the operating frequency can be reduced easily. Consequently, the circuit can respond to an increased transmission rate.

This patent application is based on and claims the benefit of the earlier filing dates of Japanese Patent Application No. 2003-407613 filed Dec. 5, 2003, and Japanese Patent Application No. 2004-292809, filed Oct. 5, 2004, the entire contents of which are hereby incorporated by reference.

The invention claimed is:

1. A data recovery circuit comprising:
    a sampling unit configured to oversample received data that have been transmitted serially in sync with a first clock of frequency f1, using a multiphase clock generated by shifting a phase of a second clock of frequency f2 at a prescribed interval, the second frequency f2 of the multiphase clock being at or below the first frequency f1;
    a data restoration unit configured to extract f1/f2 bits on average from the oversampled data and recover the extracted bits to restore the received data,
    wherein the multiphase clock is generated independently of the first clock of the received data,
    the data restoration unit recovers the extracted bits by counting the extracted bits and converting the extracted bits to symbol data when the count reaches a prescribed value,
    the data restoration unit includes a selection signal generator configured to generate a selection signal for designating bits to be extracted from the oversampled data, and
    the data restoration unit is configured to extract the f1/f2 bits on average from the oversampled data based on the selection signal.

2. The data recovery circuit of claim 1,
    wherein the selection signal generator is configured to virtually recover the first clock as a clock pattern from the oversampled data, compare the clock pattern with the oversampled data, and generate the selection signal based on a comparison result.

3. The data recovery circuit of claim 2,
    wherein the selection signal generator is configured to generate a state signal representing a number of bits to be extracted from the oversampled data and the selection signal represents information about the number of bits to be extracted and positions of the bits to be extracted.

4. The data recovery circuit of claim 2,
    wherein the selection signal generator is configured to determine whether the clock pattern is advancing or delayed from the oversampled data, count an advancing state and a delayed state, and generate the selection signal based on the counting result.

5. A data recovery circuit comprising:
    a sampling unit configured to oversample received data that have been transmitted serially in sync with a first clock of frequency f1, using a multiphase clock generated by shifting a phase of a second clock of frequency f2 at a prescribed interval, the second frequency f2 of the multiphase clock being at or below the first frequency f1;
    a data restoration unit configured to extract f1/f2 bits on average from the oversampled data and recover the extracted bits to restore the received data; and
    a multiphase clock generator configured to generate the multiphase clock independently of the first clock of frequency f1,
    wherein the sampling unit includes a serializer configured to oversample the received data over a plurality of phases using the multiphase clock, and
    the data restoration unit includes:
        a selection signal generator configured to generate a selection signal for designating bits to be extracted from the oversampled data; and
        a data selector configured to extract the f1/f2 bits on average from the oversampled data based on the selection signal.

6. The data recovery circuit of claim 5, wherein the selection signal generator is configured to virtually recover the first clock as a clock pattern from the oversampled data, to compare the clock pattern with the oversampled data, and to generate the selection signal based on a comparison result.

7. The data recovery circuit of claim 6, wherein the selection signal generator is configured to further generate a state signal representing a number of bits to be extracted from the oversampled data, and wherein the selection signal represents information about the number of bits to be extracted and positions of the bits to be extracted.

8. The data recovery circuit of claim 6, wherein the selection signal generator is configured to determine whether the clock pattern is advancing or delayed from the oversampled data, count an advancing state and a delayed state, and generate the selection signal based on the counting result.

9. A data recovery circuit comprising:
    a sampling unit configured to oversample received data that have been transmitted serially in sync with a first clock of frequency f1, using a multiphase clock generated by shifting a phase of a second clock of frequency f2 at a prescribed interval, the second frequency f2 of the multiphase clock being at or below the first frequency f1;

a data restoration unit configured to extract f1/f2 bits on average from the oversampled data and recover the extracted bits to restore the received data; and a multiphase clock generator configured to generate the multiphase clock independently of the first clock of frequency f1, wherein the data restoration unit counts a number of extracted bits and converts the extracted bits to symbol data when the number of extracted bits reaches a prescribed value, the data restoration unit includes a selection signal generator configured to generate a selection signal for designating bits to be extracted from the oversampled data, and the data restoration unit is configured to extract the f1/f2 bits on average from the oversampled data based on the selection signal.

* * * * *